(12) United States Patent
Nightingale

(10) Patent No.: US 8,180,620 B2
(45) Date of Patent: May 15, 2012

(54) APPARATUS AND METHOD FOR PERFORMING HARDWARE AND SOFTWARE CO-VERIFICATION TESTING

(75) Inventor: Andrew Mark Nightingale, Cambridge (GB)

(73) Assignee: ARM Limited, Cambridge (GB)

( * ) Notice: Subject to any disclaimer, the term of this patent is extended or adjusted under 35 U.S.C. 154(b) by 2413 days.

(21) Appl. No.: 10/764,495

(22) Filed: Jan. 27, 2004

(65) Prior Publication Data
US 2005/0165597 A1    Jul. 28, 2005

(51) Int. Cl.
*G06F 17/50*    (2006.01)
(52) U.S. Cl. ............... 703/14; 703/20; 703/27
(58) Field of Classification Search .............. 703/27, 703/20, 14
See application file for complete search history.

(56) References Cited

U.S. PATENT DOCUMENTS

| | | | |
|---|---|---|---|
| 6,678,645 B1 * | 1/2004 | Rajsuman et al. | 703/20 |
| 2003/0101041 A1 | 5/2003 | Gabele et al. | |

FOREIGN PATENT DOCUMENTS
GB    2 374 435    10/2002

OTHER PUBLICATIONS

A. Greenhill, "Core Based SoC Design System Verification Challenges" www.mentor.com, 1999.

* cited by examiner

*Primary Examiner* — Saif Alhija
(74) *Attorney, Agent, or Firm* — Nixon & Vanderhye P.C.

(57) ABSTRACT

Verification tests perform hardware and software co-verification on a system under verification. Each signal interface controller coupled to the system performs a test action transferring at least one of stimulus signals and response signals between a corresponding portion of the system under verification and the signal interface controller during verification. A debugger controls an associated processing unit that executes software routines. A debugger signal interface controller performs test actions transferring stimulus signals and response signals between the debugger and the debugger signal interface controller during verification. A test manager transfers test controlling messages to these interface controllers identifying the test actions to be performed. As a result, the test manager controls the processing unit via the debugger signal interface controller and the debugger in order to coordinate the execution of the software routines with a sequence of verification tests.

51 Claims, 17 Drawing Sheets

APPARATUS AND METHOD FOR PERFORMING HARDWARE AND SOFTWARE CO-VERIFICATION TESTING

BACKGROUND OF THE INVENTION

1. Field of the Invention

The present invention relates to techniques for performing hardware and software co-verification testing as part of verifying the design of a data processing system.

2. Description of the Prior Art

The ability to effectively and efficiently test and/or validate designs is becoming increasingly important. Typical data processing system designs are rapidly increasing in complexity and furthermore are including circuit blocks designed by a variety of different sources or companies. So-called System-on-Chip (SoC) designs that integrate a large number of functional elements on a single integrated circuit have strong advantages in terms of cost and performance, but require significant amounts of validation and testing before the designs can be reliably released for manufacture. This validation and testing requirement is becoming a bottleneck in getting new systems into the market place. Consequently, measures that can improve the efficiency and effectiveness of such validation and testing of designs are strongly advantageous.

U.S. patent application Ser. No. 09/994,023 describes a technique for performing hardware simulation using a test manager. FIG. 1A illustrates the technique discussed in that patent application. FIG. 1A discloses a verification environment 10 formed of a hardware simulation 140, a plurality of signal interface controllers 35, 40, 45, 120, 125, 130, and a test manager 20. The hardware simulation 140 represents at least a portion of a System-on-Chip on an integrated circuit modelled as Register Transfer Language (RTL), for example Verilog or VHDL, using known hardware modelling computer programs. Such hardware modelling computer programs given RTL definitions (other types of definition are also possible) of circuit designs are able to simulate the processing activity of those designs by propagating signals throughout the designs and observing responses to those signals. The techniques of hardware simulation using RTL models are well known from commercially available systems.

In the example illustrated in FIG. 1A, the hardware simulation 140 includes a bus matrix 70, in this example the bus matrix conforming to the Advanced Microcontroller Bus Architecture (AMBA) protocol developed by ARM Limited of Cambridge, United Kingdom, and further includes three devices under verification (DUVs) 90, 95, 100 connected to the bus matrix via respective buses 75, 80, 85.

The hardware simulation 140 is supplied with stimulus signals from, and returns response signals to, associated signal interface controllers 35, 40, 45, 120, 125, 130 that are also referred to herein as eXtensible Verification Components (XVCs). These signal interface controllers are connected to corresponding buses 55, 60, 65, 105, 110, 115 within the hardware simulation 140.

The modular nature of the design being simulated by the hardware simulation 140 allows it to be considered as a plurality of hardware blocks. These hardware blocks typically have their own external interface requirements that do not vary between the different designs in which they are used. Thus, a block within the hardware being simulated and its associated XVC are likely to remain unchanged, or substantially unchanged, between different designs. Thus, by building up a plurality of XVCs from a library of these XVCs, a stimulus and response interface for a whole new design as a whole may be rapidly assembled.

The action of the separate XVCs is co-ordinated by a test manager 20. The test manager 20 is responsive to pre-programmed test scenarios 25, which are written by a test engineer or machine generated to provide random state coverage, to issue test scenario controlling messages over path 30 to the various XVCs 35, 40, 45, 120, 125, 130. These test scenario controlling messages specify simulation actions to be performed by the target XVC as well as specifying when that simulation action should be performed. The simulation actions can take a wide variety of different forms depending upon the hardware block to which the particular XVC relates. Typically, the master XVCs 35, 40, 45 have simulation actions to either drive directed FRBM (File Reader BUS Master) format vectors 50 onto the associated bus, or to generate random patterns of transfers constrained by a user configuration file. FRBM is an ARM Limited proprietary format used to stimulate AMBA bus signals, for example AHB, APB or AXI, in order to perform read and write transfers on a bus interconnect.

The above described approach is used for hardware integration performance testing and provides a flexible approach for such testing. However, it does not provide any mechanism for coordinating a software based scenario running on a processor. This problem can be illustrated with reference to FIG. 1B, which shows the verification environment of FIG. 1A, but with the addition of a representation of a processor 150 provided within the hardware simulation 140. Software to be executed by the processor can be provided as user test code 190, which can be compiled and linked in a standard manner in order to load that software into the ROM 185. The processor can then execute the software by retrieving instructions from the ROM 185 via the bus matrix 70 and the memory controller 165 using the buses 155, 160 and 175. Further, a RAM 180 accessible via the bus 170 can be used for storing data used by the processor when executing the instructions.

As can be seen from FIG. 1B, the XVC verification methodology can be employed to transfer stimulus signals and/or response signals to and from the hardware simulation 140, whilst the processor 150 is executing software stored within the ROM 185, but there is no co-ordination between the software routines executing on the processor 150 and the verification testing being performed under the control of the test manager 20. Hence, the prior art techniques described above with reference to FIGS. 1A and 1B cannot readily be used to perform co-verification of hardware and software.

One known technique that aims to provide for such hardware and software co-verification is the Mentor Seamless CVE (Co-Verification Environment) product, details of which are provided in the article "Core Based SoC Design System Verification Challenges" published on the Website www.mentor.com. A general overview of the technique provided through use of this product is illustrated in FIG. 2. The Seamless™ tool allows verification tests to be performed on hardware representations as well as the execution of software routines to interact with said hardware representations. In operation the Seamless™ kernel 220 processes all the bus requests coming from the co-verification simulator 200 (an instruction set simulator running software). For each instruction or data request, the kernel 220 can choose to supply data either directly from the memory model in the co-verification memory 250 or by exercising the bus-interface model (BIM) 230, which is included as a "black box" model with the hardware simulator 240. The memory model also has a port connected to the hardware simulator. The debugger 205 is used to debug the software running on the co-verification simulator 200.

Assuming that the user has correctly implemented a bus connection between the processor bus and the memory (i.e. over path 215, 220, 225, 230, 235, 240, 255), then the data will be read from the memory model through the hardware simulation 240 and into the BIM 230. Once the user has established that the hardware design for the memory subsystem is correct then the kernel can be instructed to map all instruction and data memory areas, in the memory map, to use the high-speed direct access route (i.e. the route over path 215, 220, 245). Work can then focus on the interfaces to peripherals that remain mapped in the hardware simulator.

Proprietary algorithms within the kernel 220 decide how BIM pins should be manipulated during periods when direct access to the memory model is used, to keep the relationship between software execution state and the hardware simulation state consistent.

The limiting factor in terms of software execution performance is the execution speed of the hardware simulator 240. This can be offset by judicious use of the Seamless™ optimization features (i.e. the direct access to memory over path 245).

A Co-Verification Controller (CVC) technique described in GB-A-2,374,435 uses a verification environment provided by Specman, Seamless CVE and ModelSim to form the basis of a software/hardware co-verification testbench. The RPC technique described in that patent application adds the ability to stimulate, monitor and check an IP block (i.e. hardware simulation) through its software interface. This is an important advance that allows IP blocks to be supplied with re-useable system verification components.

With this technique, the software is tested in the context of the hardware that it drives using the high-level verification generation and coverage facilities of the testbench. Furthermore, because the software and hardware models are accessible at the same time, it is possible to set up tests that would be impractical in other environments.

The earlier-described Mentor Seamless approach, and the technique described in GB-A-2,374,435 (which makes use of the Mentor Seamless technique) employ a mechanism specific to the Seamless™ tool to access a shared memory directly when seeking to perform co-verification of the software executing on the co-verification simulator 200 whilst also performing verification of the hardware simulation 240. Although this mechanism can work well, it does not scale well with models that incorporate more than one processor, nor can it readily be migrated to testing of hardware at different abstraction levels, for example silicon level testing. Further, when employing the Mentor Seamless technique described with reference to FIG. 2, it will be appreciated that there is no direct co-ordination between stimulus input from the hardware simulator 240 and software execution state. Although the technique described in GB-A-2,374,435 does allow the co-ordination or hardware stimulus and execution of software routines, this is restricted to operation on a device-by-device basis, and there is no single entity which is in control of the test procedure.

Accordingly, it would be desirable to provide an improved technique for performing hardware and software co-verification testing.

SUMMARY OF THE INVENTION

Viewed from a first aspect, the present invention provides apparatus for performing a sequence of verification tests to perform hardware and software co-verification on a system under verification, comprising: a plurality of signal interface controllers operable to be coupled to said system under verification, each signal interface controller being operable to perform one or more test actions transferring at least one of one or more stimulus signals and one or more response signals between a corresponding portion of the system under verification and said signal interface controller during performance of said sequence of verification tests; a debugger operable to control operation of a processing unit associated with the system under verification, the processing unit being operable to execute software routines; a debugger signal interface controller operable to interface with the debugger and to perform one or more test actions transferring at least one of one or more stimulus signals and one or more response signals between the debugger and said debugger signal interface controller during performance of said sequence of verification tests; and a test manager coupled to said plurality of signal interface controllers and the debugger signal interface controller and operable to transfer test controlling messages to said plurality of signal interface controllers and the debugger signal interface controller identifying the test actions to be performed; the test manager being operable to control the operation of the processing unit via the debugger signal interface controller and the debugger in order to co-ordinate the execution of said software routines with the sequence of verification tests.

In accordance with the present invention, a debugger signal interface controller is provided which is operable to interface with a debugger used to control the operation of a processing unit associated with the system under verification. A test manager is then arranged to send test controlling messages to the debugger signal interface controller, and to other signal interface controllers coupled to the system under verification, identifying test actions to be performed by those interface controllers. With regard to the debugger signal interface controller, this enables the test manager to cause the debugger signal interface controller to perform one or more test actions such that at least one of one or more stimulus signals and one or more response signals are passed between the debugger and the debugger signal interface controller during performance of the sequence of verification tests, this allowing the test manager to control the operation of the processing unit via the debugger signal interface controller and the debugger in order to co-ordinate the execution of the software routines with the sequence of verification tests.

Thus, in accordance with the present invention, co-verification of hardware and software can be performed in a co-ordinated manner. In particular, this approach enables the co-ordination of specific software test routines with the application of hardware stimulus to the system under verification, under the control of the test manager.

In accordance with the present invention, the debugger is controlled by the test manager via the debugger signal interface controller, which provides a very flexible and efficient technique for controlling operation of a processing unit coupled to that debugger.

There are a number of ways in which the debugger signal interface controller may generate an appropriate test action in response to receipt of a test controlling message from the test manager. In one embodiment, the apparatus further comprises a memory in which the software routines are stored, the debugger signal interface controller being provided with an address indication identifying the addresses of the software routines within the memory, upon receipt of a test controlling message from the test manager, the debugger signal interface controller being operable to generate a corresponding test action with reference to the address indication. As an example of the implementation of such an embodiment, the test controlling message from the test manager may identify, for example by a predetermined name, a particular software routine to be executed, and with reference to the address indication the debugger signal interface controller can then perform a corresponding test action during which the address for the required software routine is passed to the debugger as part of a stimulus signal.

In one embodiment, the apparatus further comprises a status memory operable to store status data, the processing unit being operable to execute monitoring code to monitor the status data in order to identify any changes to the status data and to then execute at least one of said software routines as identified by the change in status data, the corresponding test action being arranged to cause updated status data identifying a corresponding one of said software routines to be stored in the status memory under the control of the debugger. Hence, in accordance with this embodiment, the processing unit is placed in a remote control mode where it monitors the status data and reacts to a change in the status data by performing a software routine identified by that change in status data.

It will be appreciated that there are a number of ways in which the debugger may cause the updated status data to be placed in the status memory. However, in one embodiment, the debugger is operable to cause the processing unit to store the updated status data in the status memory, whereafter the processing unit reverts to executing the monitoring code. Hence, in accordance with this embodiment, the execution of the monitoring code is temporarily interrupted by the debugger, and the processing unit is then used to store the updated status data in the status memory. Thereafter, the processing unit reverts to executing the monitoring code, as a result of which it will notice the change in the status data, and accordingly will execute the appropriate software routine(s) as identified by the change in status data.

In an alternative embodiment, rather than employing a change in the status data in the status memory to trigger execution of the required software routine, an alternative mechanism is used. Typically, the processing unit has a plurality of registers associated therewith, and in accordance with this alternative technique, the corresponding test action is arranged to cause data in a selected register of said plurality of registers to be updated under the control of the debugger, such that the processing unit will then execute a corresponding one of said software routines.

In one particular embodiment, the selected register is operable to store a program counter value and the corresponding test action is arranged to cause the program counter value to be updated in order to cause the processing unit to branch to a corresponding one of said software routines. The program counter value identifies the address of a current instruction being executed by the processing unit, and accordingly by changing the value of the program counter value, this mechanism will cause the processing unit to branch to a new address, which can be arranged to identify the beginning of the required software routine.

It will be appreciated that as part of the verification process, it will typically be desired to determine, following execution of a software routine by the processing unit, whether the execution of that software routine has completed successfully. In one embodiment, upon execution of one of the software routines, the processing unit is operable to update status data indicative of whether the software routine has completed successfully.

It will be appreciated that this status data will then need to be analysed in order to determine whether the operation was successfully completed or not. There are a number of ways in which this updated status data may be extracted by the debugger signal interface controller. For example, in one embodiment, the debugger signal interface controller may be arranged to periodically perform test actions which cause the debugger to temporarily halt the processing being performed by the processing unit so as to enable the debugger to read the status data.

However, in an alternative embodiment, the debugger signal interface controller is operable to perform a predetermined test action in order to cause a breakpoint to be set by the debugger which is triggered when the processing unit performs said update of the status data. The ability for a debugger to set a breakpoint is a standard feature of many debuggers. In accordance with this embodiment of the present invention, this feature is used to improve the efficiency of the process, since it is no longer necessary to periodically interrupt the operation of the processing unit in order to determine whether the execution of the software routine has completed. Further, this can improve the accuracy of the verification process, since it avoids any risk that the periodic interruption of the processing unit during execution of the software routine might affect the successful operation or otherwise of that software routine.

In one embodiment, the debugger is operable to issue a callback event to the debugger signal interface controller upon triggering of the breakpoint. This simple mechanism then identifies to the debugger signal interface controller that the processing unit has finished executing the particular software routine, and accordingly the debugger signal interface controller can then initiate any appropriate further step. For example, as discussed earlier, the debugger signal interface controller will typically wish to read the updated status information in order to determine whether execution of the software routine has completed successfully or not, and accordingly at this point in time the debugger signal interface controller can be arranged to perform a further test action in order to cause the updated status data to be retrieved by the debugger for analysis by the debugger signal interface controller or by the test manager. In one particular embodiment, the updated status data is analysed by the debugger signal interface controller, and then a signal indicative of whether the execution of the software routine has completed successfully is returned to the test manager.

Whilst in the above described embodiment a breakpoint mechanism is used for handshaking status information between the software running on the processing unit and the debugger signal interface controller, it will be appreciated that various other mechanisms may be used, for example a watchpoint mechanism may be used. Furthermore, in embodiments where the debugger and its interface to the system under verification support a shared status memory which can be accessed by the debugger signal interface controller whilst the software is running, it will be appreciated that there may be no requirement for such a breakpoint mechanism to be used. Indeed, future ARM debugger implementations may provide hardware support for reading and writing memory whilst software is running on the processor, and in such embodiments no break-point shared data handshaking would be required.

It will be appreciated that there are a number of ways in which the debugger signal interface controller and the debugger may pass signals between themselves. In one embodiment, the stimulus and/or response signals are transferred between the debugger signal interface controller and the debugger using Application Programming Interface (API) calls. Accordingly, a standardised interface is provided between the debugger signal interface controller and the debugger so that an interface protocol already supported by the debugger can be used. In one particular embodiment, the debugger signal interface controller is coupled to the debugger via an EABS interface. EABS (Extension ABStraction) is an ARM proprietary interface within RVD (ARM RealViewDebugger) that allows third parties to write a shared object, (.dll or .so), that plugs into RVD and gives access to its debug functionality. In one embodiment of the present invention, this interface forms part of the debugger signal interface controller. The debugger would provide an EABS interface, or in different embodiments may provide a similar interface specific to the debugger being used.

In one embodiment, the software routines to be executed by the processing unit may be pre-stored in memory, and accordingly for example may be stored in a ROM. However, in an alternative embodiment, at least one of the software routines is written into the memory via the debugger under the control of the debugger signal interface controller. Accordingly, the test manager may issue test controlling messages to the debugger signal interface controller to cause the debugger signal interface controller to perform one or more test actions in order to transfer the instructions making up a software routine into the memory via the debugger. This provides a flexible approach for loading of software into the memory for execution by the processing logic.

In embodiments where the debugger command interface is used to download a program dynamically into memory, for example RAM, and where functions are executed by manipulating the processor model program counter, there is no need to employ the breakpoint status monitoring methodology as described earlier.

In one embodiment of the present invention, multiple processing units are provided, and a corresponding multiple of debugger signal interface controllers are provided, each debugger signal interface controller communicating with the same debugger to cause their respective test actions to be performed. Accordingly, it can be seen that the technique of embodiments of the present invention is readily expandable to systems where multiple processing units are used, and accordingly provides a very flexible technique for the co-verification of hardware and software.

It will be appreciated that there are a number of ways in which the execution of the software routines may be co-ordinated with the sequence of verification tests. In one embodiment, it is the timing of the execution of the software routines which is coordinated with the sequence and verification tests. Alternatively, or in addition, the co-ordination may involve flagging to the test manager that certain events have occurred in the software being executed, and/or the reacting to events from the test manager in order to change the state of the software being executed.

It will be appreciated that the system under verification may take a variety of forms. However, in one embodiment, the system under verification comprises a plurality of components, each signal interface controller being associated with one of said components. Typically, there may be one or more components which do not have a signal interface controller associated with them, and also it is possible that more than one signal interface controller may be associated with a particular component.

In one embodiment, the processing unit forms one of the components of the system under verification. However, in an alternative embodiment, the processing unit is provided as part of the apparatus, externally to the system under verification.

It will be appreciated that the processing unit may take a variety of forms. However, in one embodiment, the processing unit comprises a representation of a processor on which the software routines are intended to be executed. In one particular embodiment, the processing unit takes the form of a software model representing the processor.

The system under verification may take a variety of forms, and in particular may be provided at a number of different levels of abstraction. For example, the system under verification may in certain situations be provided on silicon or may be provided as a FPGA (Field Programmable Gate Array), whilst in other embodiments it may be provided at the RTL level. In one embodiment, the system under verification comprises a hardware simulator responsive to said one or more stimulus signals to generate said one or more response signals simulating a response of a data processing apparatus to said one or more stimulus signals if applied to said data processing apparatus. Accordingly, in one example, an RTL representation of the components of the system under verification may be loaded into a hardware simulator so as to simulate the response of the modelled data processing apparatus to one or more stimulus signals input to the hardware simulator.

Viewed from a second aspect, the present invention provides a method of performing a sequence of verification tests to perform hardware and software co-verification on a system under verification, comprising the steps of: performing in each of a plurality of signal interface controllers coupled to said system under verification one or more test actions transferring at least one of one or more stimulus signals and one or more response signals between a corresponding portion of the system under verification and said signal interface controller during performance of said sequence of verification tests; controlling via a debugger execution of software routines by a processing unit associated with the system under verification; performing in a debugger signal interface controller coupled with the debugger one or more test actions transferring at least one of one or more stimulus signals and one or more response signals between the debugger and said debugger signal interface controller during performance of said sequence of verification tests; and transferring test controlling messages from a test manager to said plurality of signal interface controllers and to the debugger signal interface controller, the test controlling messages identifying the test actions to be performed; whereby the test manager controls the operation of the processing unit via the debugger signal interface controller and the debugger in order to co-ordinate the execution of said software routines with the sequence of verification tests.

Viewed from a third aspect, the present invention provides a computer program product for performing a sequence of verification tests to perform hardware and software co-verification on a system under verification, the computer program product comprising: a plurality of signal interface controller code blocks operable to be coupled to said system under verification, each signal interface controller code block being operable to perform one or more test actions transferring at least one of one or more stimulus signals and one or more response signals between a corresponding portion of the system under verification and said signal interface controller code block during performance of said sequence of verification tests; debugger code operable to control operation of a processing unit associated with the system under verification, the processing unit being operable to execute software routines; a debugger signal interface controller code block operable to interface with the debugger code and to perform one or more test actions transferring at least one of one or more stimulus signals and one or more response signals between the debugger code and said debugger signal interface controller code block during performance of said sequence of verification tests; and test manager code coupled to said plurality of signal interface controller code blocks and the debugger signal interface controller code block and operable to transfer test controlling messages to said plurality of signal interface controller code blocks and the debugger signal interface controller code block identifying the test actions to be performed; the test manager code being operable to control the operation of the processing unit via the debugger signal interface controller code block and the debugger code in order to co-ordinate the execution of said software routines with the sequence of verification tests.

Viewed from a fourth aspect, the present invention provides a computer program operable when loaded onto a computer to cause the computer to operate in accordance with the method of the second aspect of the present invention.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1A:
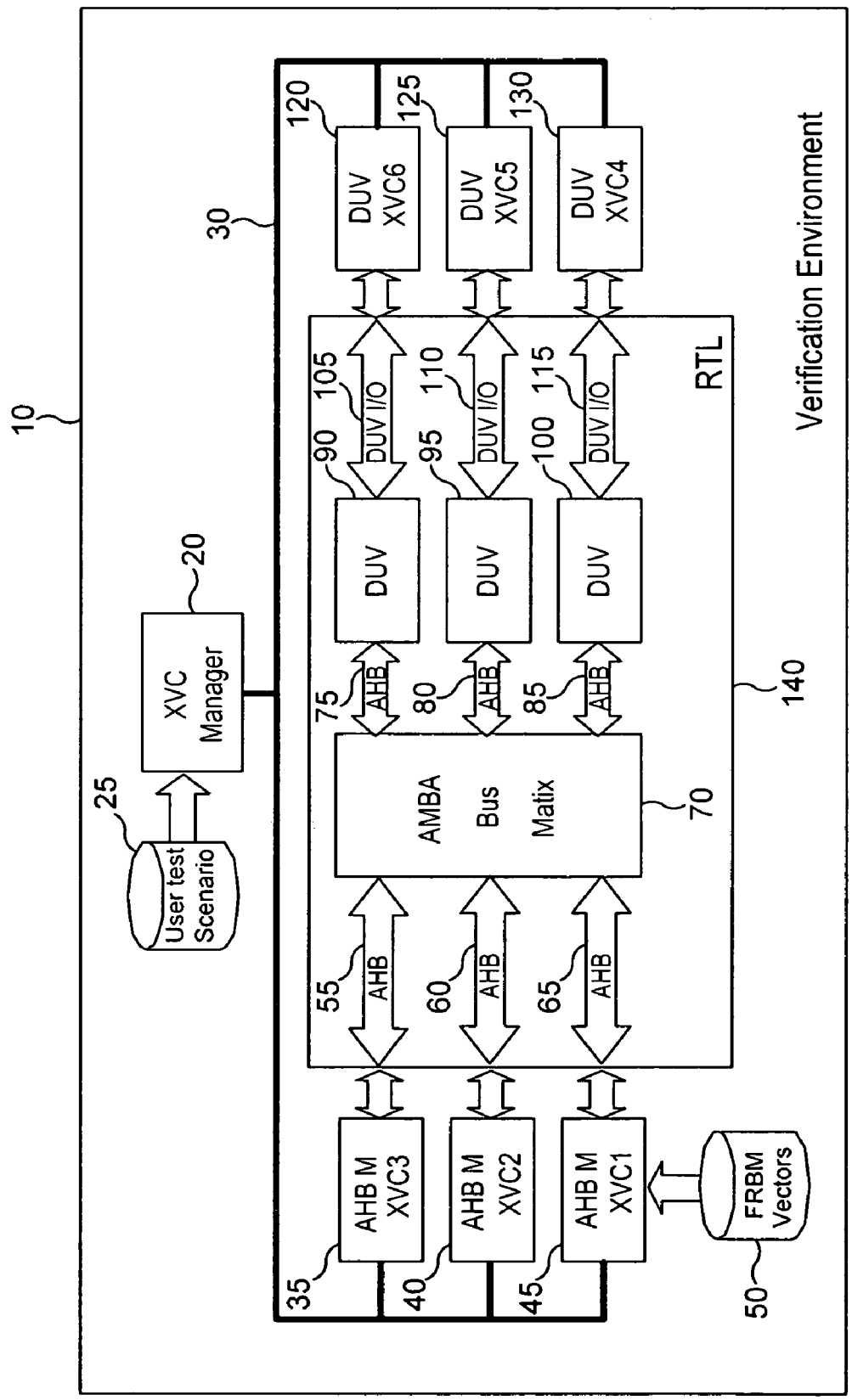
FIGS. 1A and 1B illustrate how a test manager and a plurality of signal interface controller are used to perform hardware simulation in accordance with a known prior art technique.
Figure 1B:
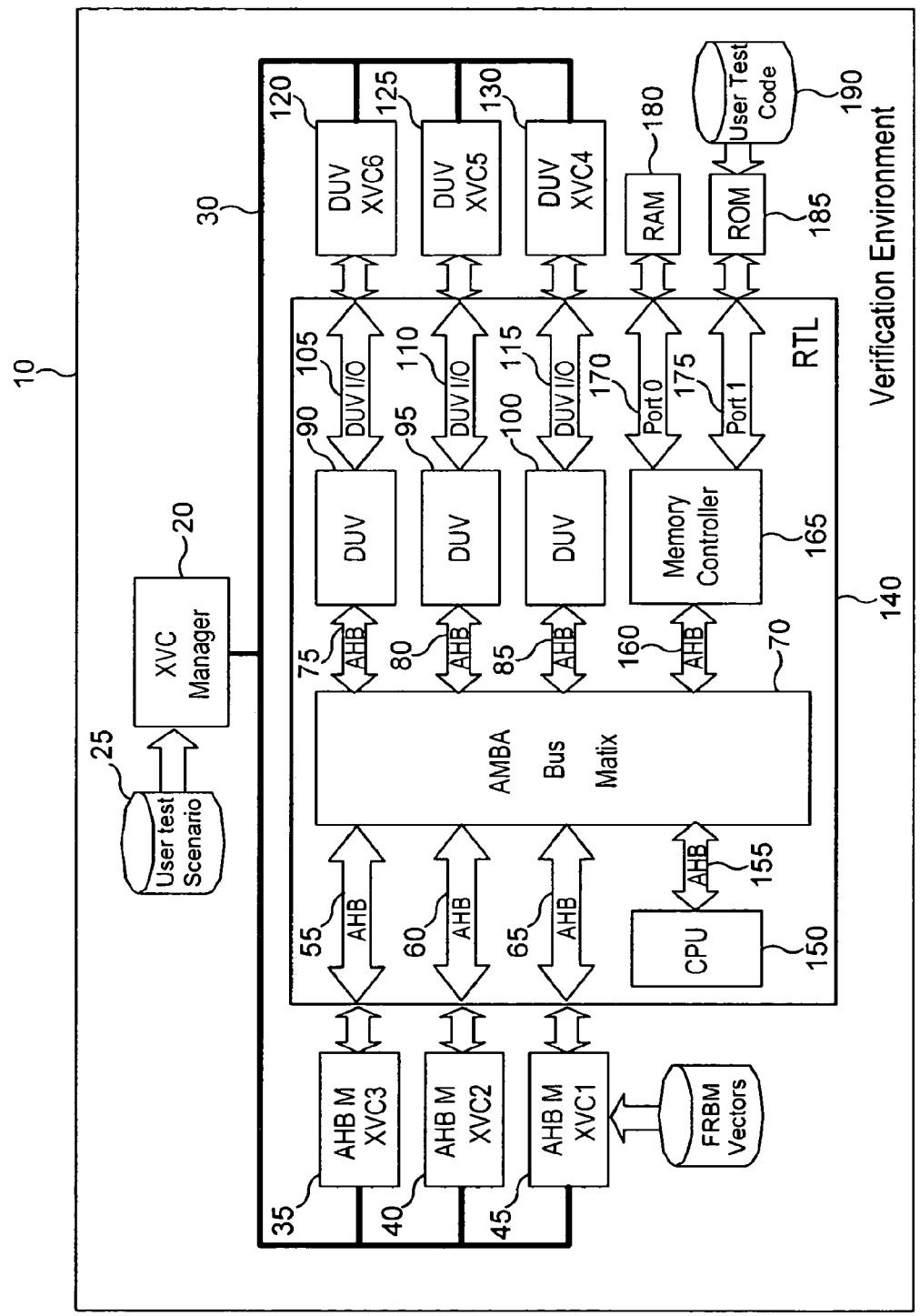
Figure 2:
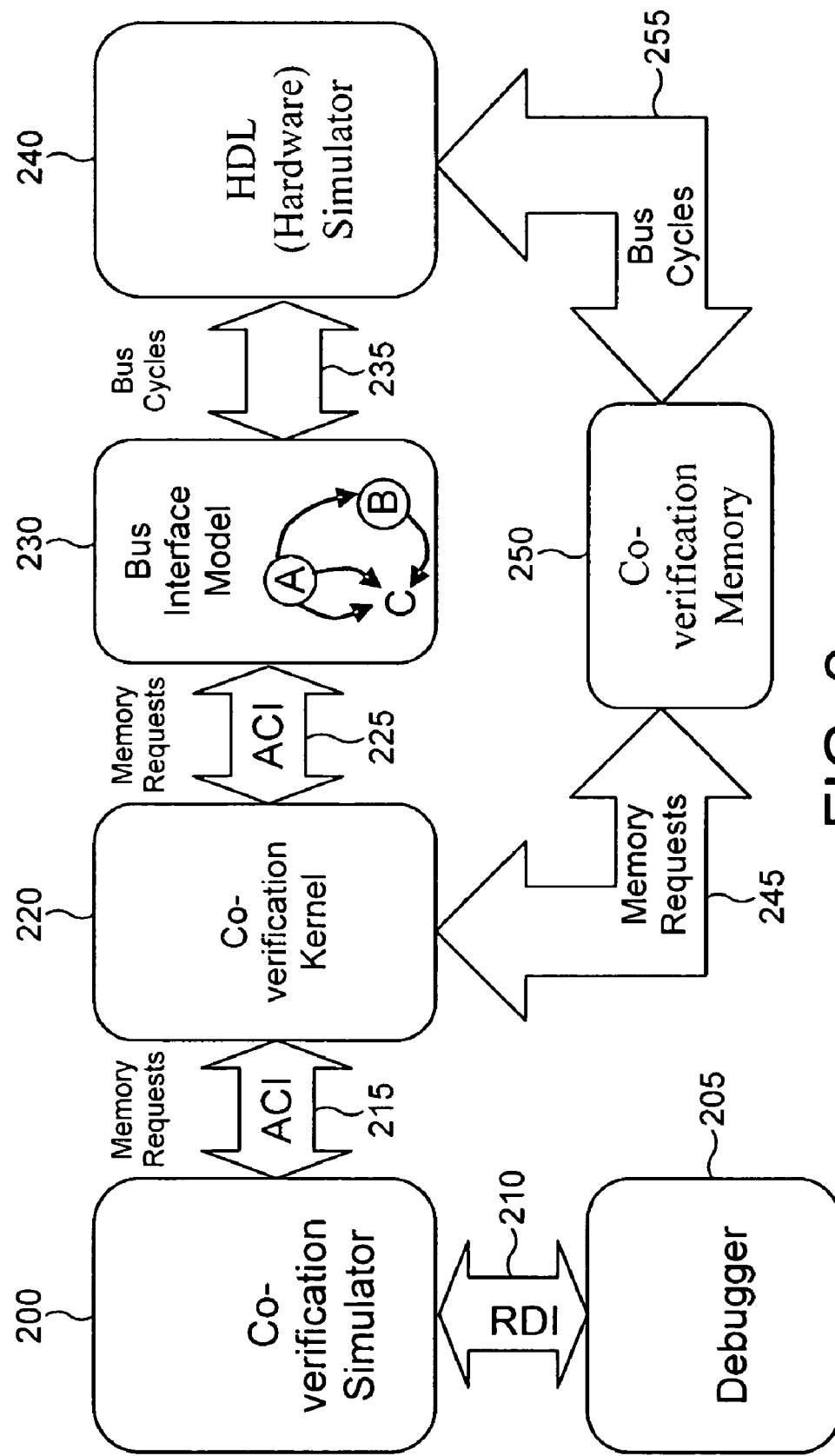
FIG. 2 schematically illustrates the operation of the Mentor Seamless CVE (Co-Verification Environment) in accordance with a known technique.
Figure 3:
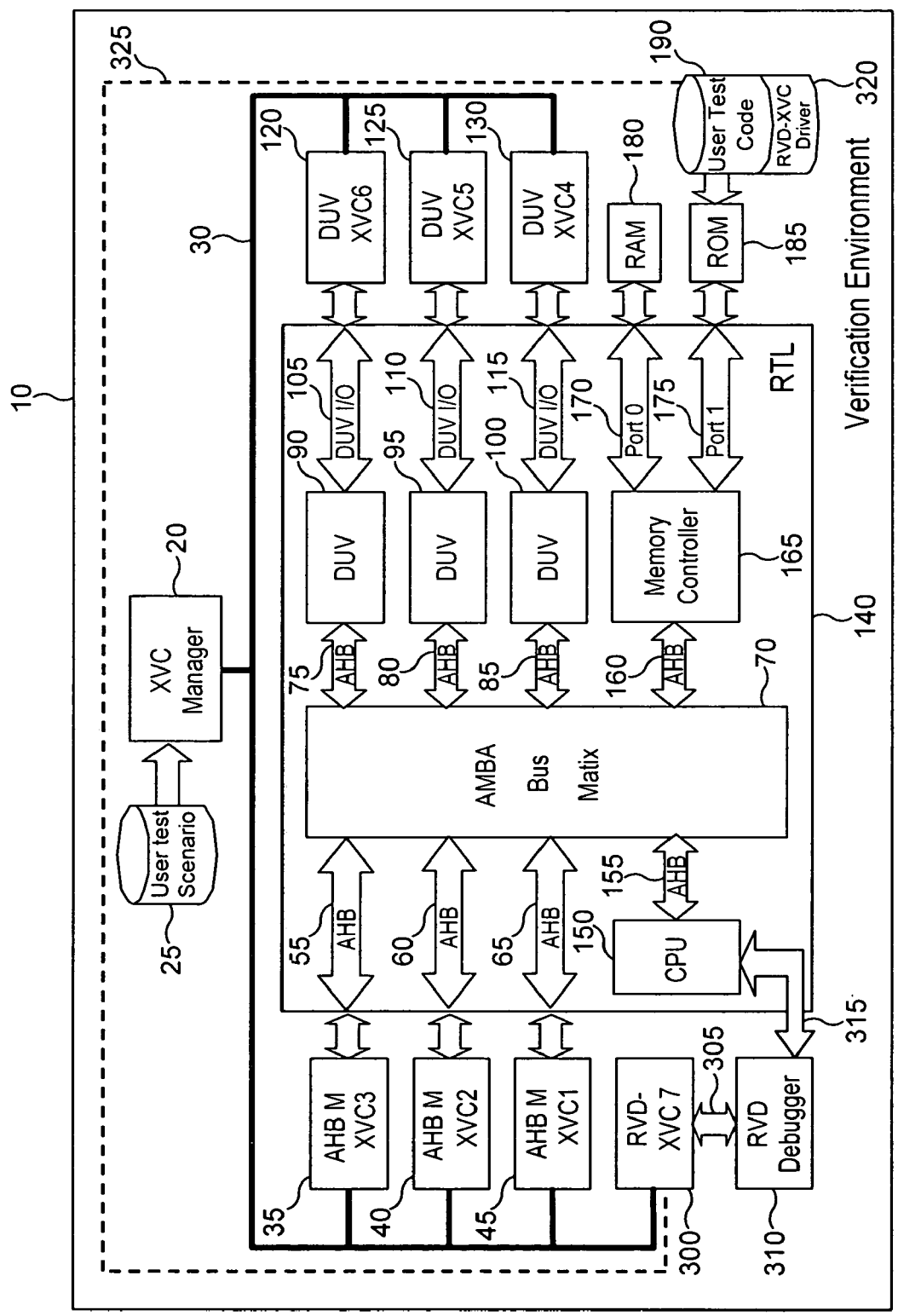
FIG. 3 illustrates an apparatus for performing hardware and software co-verification in accordance with a first embodiment of the present invention.

FIG. 3 is a block diagram illustrating an apparatus for performing hardware and software co-verification in accordance with a first embodiment of the present invention. By comparison with the earlier described prior art of FIG. 1B, it can be seen that the same reference numerals have been used for those elements that are the same as described earlier with reference to FIG. 1B, and those elements operate in the same manner as described earlier with reference to FIG. 1B. By comparison of FIG. 3 with FIG. 1B, it can be seen that the verification environment 10 of the first embodiment of the present invention now additionally includes a debugger 310 and an associated debugger signal interface controller 300 which is coupled to the test manager 20 via path 30. In the particular example illustrated in FIG. 3, the debugger is an ARM RealView Debugger (RVD) and the debugger signal interface controller is accordingly an RVD signal interface controller, also referred to herein as an RVD-XVC (eXtensible Verification Component). Additionally, some driver code 320 is included with the user test code 190 that, as will be discussed later, enables the processor 150 to be placed in a remote control mode of operation.

When performing the user-defined test scenarios 25, the test manager 20 can now, in addition to sending test controlling messages to the XVCs 35, 40, 45, 120, 125, 130, send test controlling messages to the RVD-XVC 300 in order to cause the RVD-XVC 300 to perform one or more test actions. As will be discussed in more detail below, this enables the test manager to control via the debugger 310 the operation of the processor 150, so that software routines executed by the processor can be co-ordinated with the sequence of verification tests performed on the hardware simulation 140.

When the user test code 190 is compiled and linked for storing in the ROM 185, an address map is generated identifying the addresses of functions of a piece of software code to be tested, and thus providing the addresses of individual software routines provided by the user test code. This address map is provided over path 325 to the RVD-XVC 300. At boot time, the processor 150 will communicate with the memory controller 165 via the buses 155 and 160 and via the bus matrix 70 in order to retrieve from ROM 185 via path 175 a number of instructions defining an initialisation routine to be executed by the processor 150. This will typically cause the processor to establish some working space within the RAM 180, to enable storage, amongst other things, of status data maintained by the processor during execution of instructions. At the end of execution of this initialisation code, execution will branch to the RVD-XVC driver code 320 which is arranged to cause the processor 150 to monitor the status data within the RAM 180. Whenever the status data is changed, this will cause the processor to branch to a particular software routine identified by the change in status data to cause that software routine to be executed, and following execution of that particular software routine, the status data will then be updated by the processor 150 to indicate whether execution of that software routine was successful or not.

Once the initialisation code has been executed, the processor 150 will be able to receive communications initiated by the RVD-XVC 300 via the debugger 310. These communications take place via a communications link established at the time of initialisation.

To cause the processor 150 to execute a specific software routine, the test manager 20 will issue a test controlling message to the RVD-XVC 300, which will cause the RVD-XVC 300 to perform an execute test action during which an indication of the address of that particular software routine will be provided as a stimulus signal over the interface 305 to the debugger 310, this address being determined with reference to the address map received by the RVD-XVC 300 over path 325. This will cause the RVD debugger 310 to communicate with the CPU 150 over the path 315 to interrupt execution of the driver code 320 by the CPU 150, and to then cause the CPU 150 to make the necessary update to the status data maintained within the RAM 180. Once this update has taken place, the debugger 310 will then release control back to the processor 150, at which point the processor 150 will return to execution of the driver code 320, and as a result will identify that the status data in the RAM 180 has changed. This will then cause the processor 150 to execute the particular software routine as identified by the change in status data, and upon completion of execution of that software routine, the processor 150 will then update the status data in the RAM 180. At this point, the processor 150 will then return to execution of the driver code 320 to monitor for any further changes to the status data.

The status data as updated by the processor 150 upon completion of execution of the particular software routine then needs to be analysed by the RVD-XVC 300 and/or the test manager 20 in order to determine whether execution of the software routine was successful. There are a number of ways in which this can be done. In one embodiment, the RVD-XVC 300 can be arranged to periodically cause the debugger 310 to interrupt execution of the processor 150, so that the contents of the status data in the RAM 180 can be read by the debugger 310 and returned to the RVD-XVC 300. However, this in invasive to the processing of the processor 150, and hence in an alternative embodiment a breakpoint mechanism provided by the debugger 310 is employed to notify the RVD-XVC 300 once the CPU 150 has completed execution of the software routine. In particular, the RVD-XVC 300 can perform a test action which causes the debugger 310 to set a breakpoint which is then triggered when the processing unit performs the update of the status data at the end of the execution of the software routine. The debugger 310 then issues a call-back event to the RVD-XVC 300 to indicate that the status data has been updated.

The RVD-XVC 300 can then issue a further test action to the debugger 310 to cause it to interrupt processing of the processor 150, so that the status data in the RAM 180 can be read by the debugger 310, and then returned to the RVD-XVC 300.

In one embodiment, this status data is then analysed by the RVD-XVC 300 to determine whether the execution of the software routine was successful or not, after which a signal indicative of the success is returned to the test manager 20 over path 30.

It can be seen that this approach enables the test manager 20 to perform the usual hardware verification tests via the various XVCs 35, 40, 45, 120, 125, 130 whilst also at the same time co-ordinating the timing of execution of particular software routines by the processor 150 via communications between the RVD-XVC 300 and the debugger 310. This provides a very efficient technique for co-ordinating the execution of software routines with the sequence of verification tests when performing hardware and software co-verification on the system under verification, i.e. the hardware simulation 140.

Another coordination aspect that can be managed by embodiments of the present invention is the signalling by the debugger signal interface controller to the test manager that a software status flag has been set, or the signalling from the test manager to the debugger signal interface controller that a hardware status flag has been set. In this context the verification engineer would be interested to see if certain events would occur rather than when, for example to check whether a FIFO full event on a hardware block was recognised correctly by a piece of software designed to stimulate that block, or to check that this condition never occurred. The verification engineer would determine what conditions/states were required to fire these events and would typically refer to them as 'corner-cases'. Such corner-cases could be used as assertions/error-traps. Hence, to summarise, in one embodiment of the present invention, co-ordination may involve one or more of the following aspects:
1. Timing, i.e. synchronisation of the software being executed with hardware state changes and I/O;
2. Flagging of events from the software being executed to the test manager; and/or
3. Reaction to events from the test manager to change the state of the software being executed.

Figure 4:
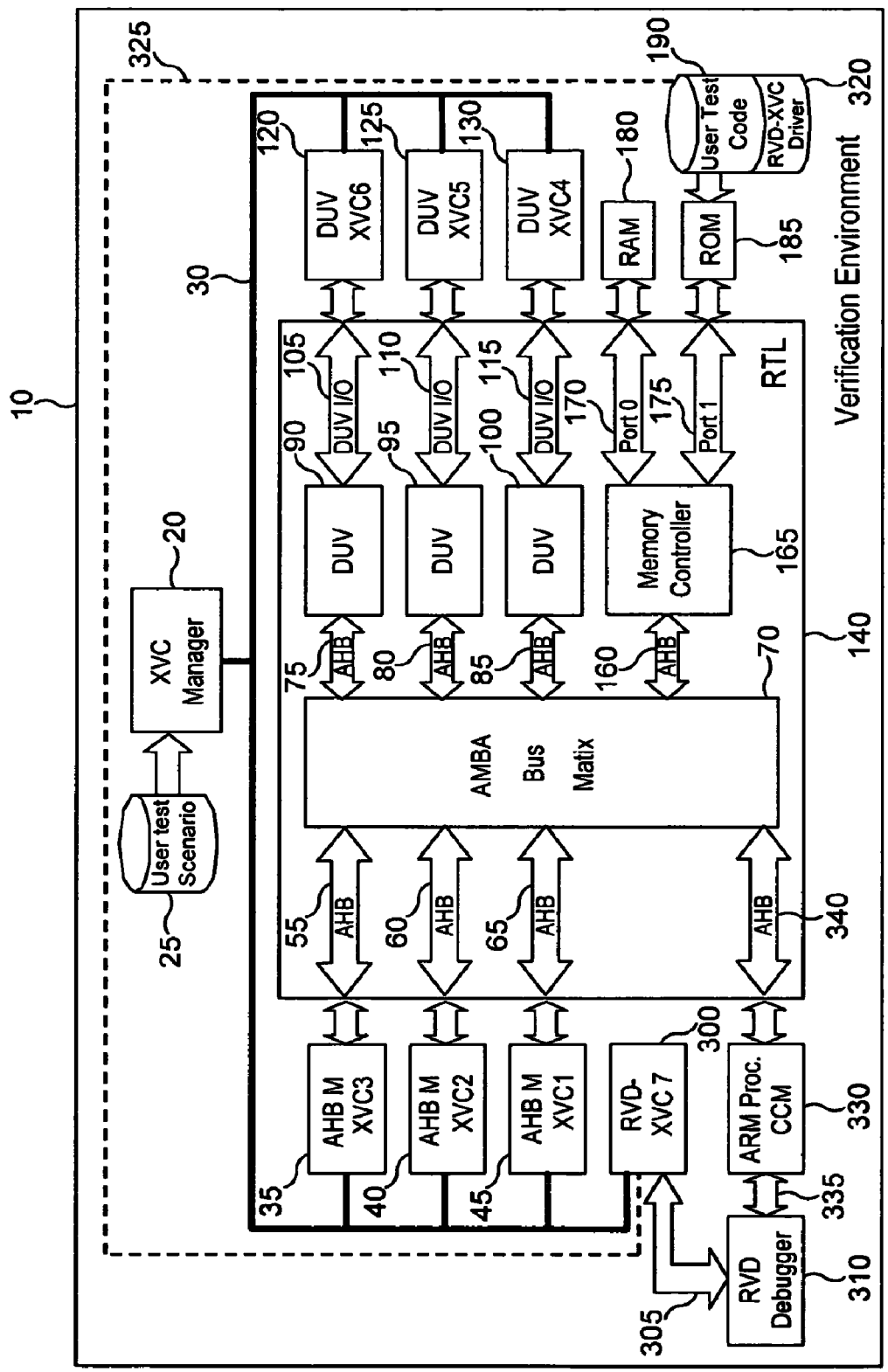
FIG. 4 illustrates an apparatus for performing hardware and software co-verification in accordance with a second embodiment of the present invention.

FIG. 4 illustrates a second embodiment of the present invention, where the processor 150 is not provided as part of the hardware simulation 140, but instead is provided as a software model 330 external to the hardware simulation 140. In the particular example illustrated in FIG. 4, the software model 330 of the processor is a Cycle Callable Model (CCM) of an ARM processor core. When the system under verification 140 is provided at the RTL level, the processor core 150 of FIG. 3 may operate more slowly than the CCM 330 of FIG. 4, and accordingly it can provide significant speed benefits to provide the processor representation externally to the system under verification. Further, this can simplify the interface 335 between the debugger and the processor model 330, since the debugger 310 and the processor model 330 are then entirely software components, and hence the interface 335 is then solely a software interface. Nevertheless, if the system under verification were provided at the FPGA (Field Programmable Gate Array) level, or at the silicon level, then the processor will typically execute more quickly if provided within the system under verification, rather than as an external software model. However, this would increase the complexity of the interface between the debugger and the processor.

Other than the fact that the representation of the processor is now provided as a software model 330 external to the hardware simulation 140, rather than being provided by a representation of the processor 150 provided internally to the hardware simulation, the execution of the verification environment 10 of FIG. 4 operates in the same manner as described earlier with reference to FIG. 3.

In both the embodiments of FIGS. 3 and 4, the interface 305 between the RVD-XVC 300 and the debugger 310 is preferably provided by a standard debugger external interface, in one embodiment this being an EABS extension DLL interface, thereby avoiding any need to modify the debugger 310 in order to allow it to receive communications from the RVD-XVC 300. In accordance with this standard interface, the stimulus and/or response signals are transferred between the RVD-XVC 300 and the debugger 310 using Application Programming Interface (API) calls.

As an alternative to running the processor in the remote control mode described above with reference to FIGS. 3 and 4, a different implementation may be used to cause the processor 150, 330 to perform a particular software routine. In particular, the processor will typically have a number of working registers associated therewith, and the RVD-XVC 300 can be arranged to perform a test action in order to cause the contents of one of those registers to be updated under the control of the debugger 310. In one particular embodiment, one of the registers will contain the program counter (PC) value, and the test action can be arranged to cause the PC value to be updated, as a result of which the processor will branch to the corresponding software routine identified by the updated PC value. The same techniques as described earlier could then be used to determine when execution of that software routine has been completed, so as to enable the updated status data to be analysed.

In the embodiments described with reference to FIGS. 3 and 4, the user test code is loaded into ROM 185, and executed from the ROM. However, in an alternative embodiment, it is possible for at least one of the software routines to be written into the RAM 180 via the debugger 310 under the control of the RVD-XVC 300 in response to appropriate test controlling messages issued to the RVD-XVC 300 from the test manager 20. This provides additional flexibility in specification of the user test code to be executed by the processor 150, 330.

The RVD debugger 310 has a multiple-processor connection, and allows the user to hence debug targets that contain multiple processors. Accordingly, the verification environment 10 of FIGS. 3 and 4 can be modified to include multiple processors, which all communicate with the same debugger 310. Each processor will then have a corresponding RVD-XVC 300, such that each RVD-XVC object will have access to a particular target processor via the debugger. Accordingly, the above described technique provides a very scalable technique for performing hardware and software co-verification in a multi-processor environment.

Figure 5A:
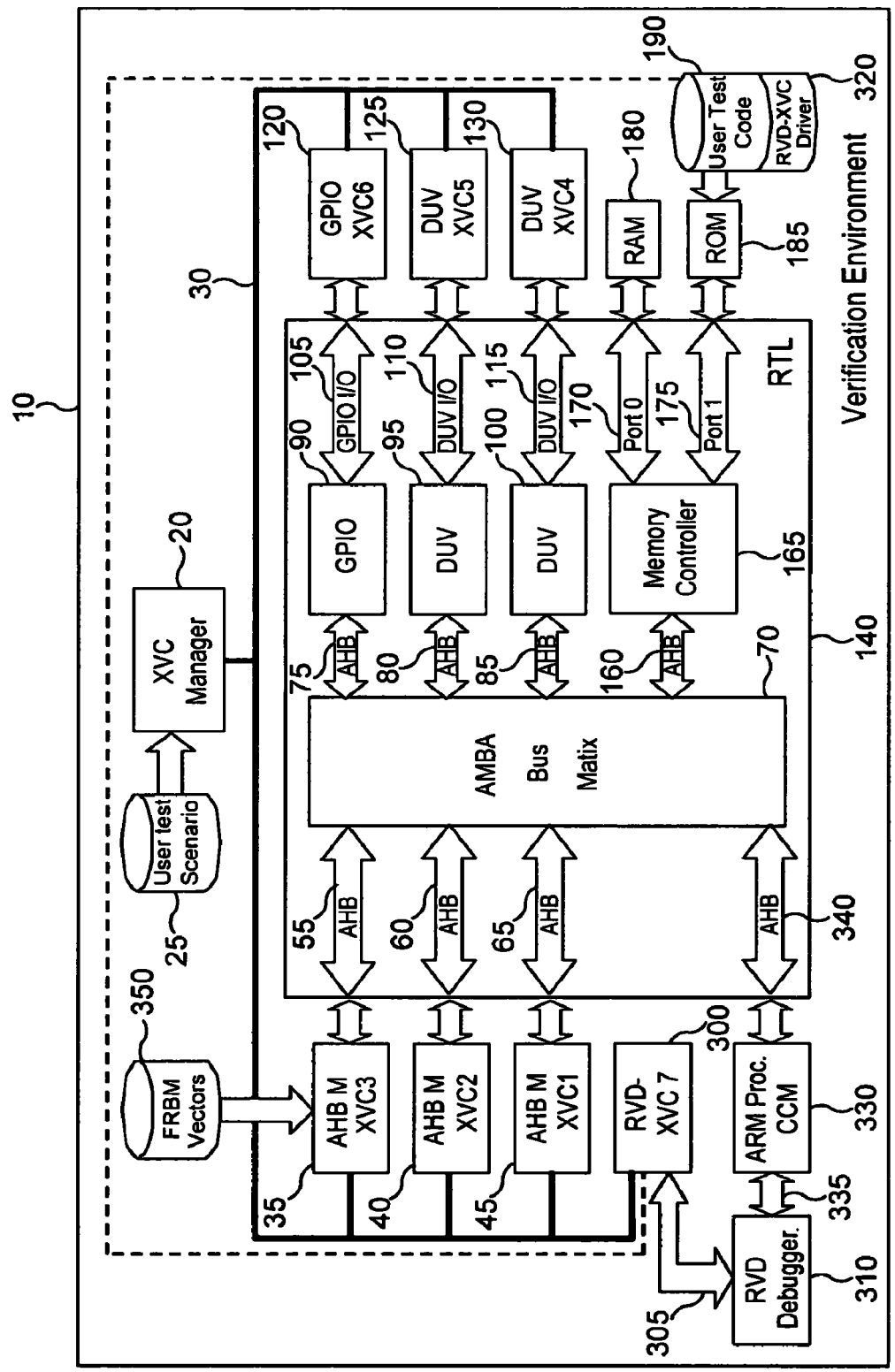
FIG. 5A illustrates a particular example of an apparatus in accordance with the second embodiment of the present invention.
Figure 5B:
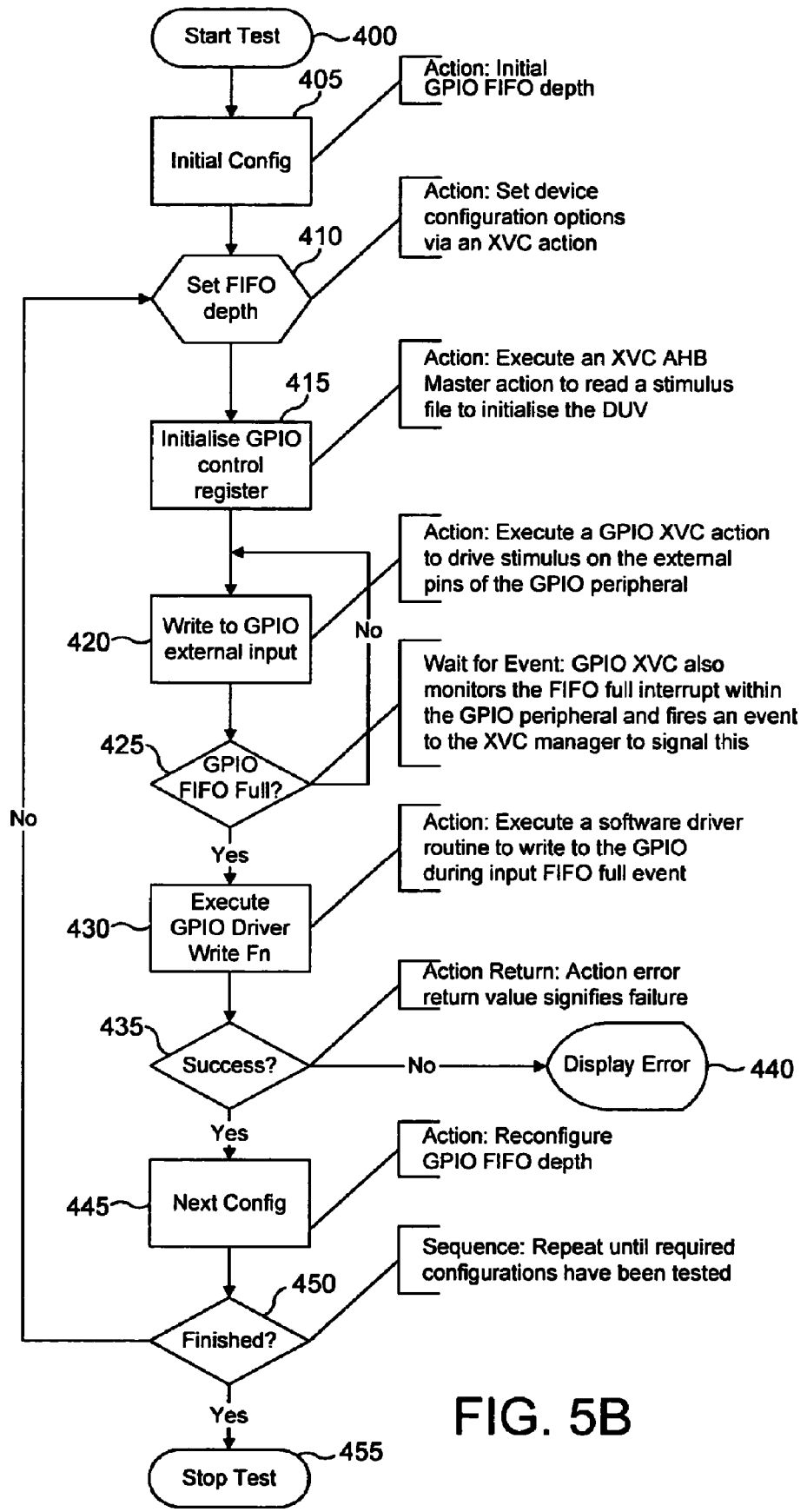
FIG. 5B is a flow diagram illustrating a single hardware/software co-verification test performed on the apparatus of FIG. 5A.

FIGS. 5A and 5B are used to illustrate a simple hardware/software co-verification test that may be employed using the techniques of one embodiment of the present invention. FIG. 5A is a diagram similar to FIG. 4, but where the device under verification 90 is specified to be a general purpose input/output (GPIO) device, and accordingly the XVC 120 is a GPIO XVC. Further, the AHB master XVC 35 is shown as having access to FRBM vectors 350, which can be considered analogous to the FRBM vectors 50 discussed earlier with reference to FIGS. 1A and 1B.

FIG. 5B is a flow diagram illustrating the steps performed by the verification environment 10 of FIG. 5A in order to perform a particular hardware/software co-verification test. At step 400, the test is started, whereafter at step 405 an initial configuration is selected by the test manager 20 with reference to the user test scenario 25.

Thereafter, at step 410, the test manager 20 causes the AHB master XVC 35 to set configuration options of the GPIO device 90 via input of an appropriate stimulus signal over buses 55 and 75 via the bus matrix 70. In particular, these configuration options will specify a FIFO depth for a FIFO contained within the GPIO device 90, this FIFO depth being identified by the initial configuration data determined at step 405.

The process then proceeds to step 415, where the test manager 20 again causes the AHB master XVC 35 to perform a test action in order to read a stimulus file in order to initialise the GPIO device 90. The stimulus file may be obtained from the FRBM format vectors 350, or may be generated on a random basis constrained by a user configuration file.

Thereafter, the process proceeds to step 420, where a write operation is performed to the GPIO device's external input. This is achieved by causing the GPIO XVC 120 to drive stimulus onto the external pins of the GPIO device 90 over the bus 105.

At step 425, it is determined whether the GPIO FIFO is full, and if not the process returns to step 420 to cause further stimulus to be driven onto the external input of the GPIO device. At step 425, the GPIO XVC 120 monitors the FIFO full interrupt within the GPIO device 90, and sends an event to the test manager 20 to signal when the GPIO FIFO is full.

When the GPIO FIFO is full, the test manager 20 then issues a test controlling message to the RVD-XVC 300 to cause a test action to be performed at step 430 in order to control the processor 330 via the debugger 310 so that it executes a software driver routine to write to the GPIO device 90. Clearly, this will cause the software executing on the processor to write to the GPIO device in a situation where the input FIFO of the GPIO device is full. This is clearly an interesting corner case condition where there is the potential for incorrect processing to take place.

At step 435, it is determined whether execution of the software routine was successful. To determine this success, the RVD-XVC 300 is arranged to issue a test action to the debugger 310, to cause the debugger to interrupt the processor 330, so that the updated status data placed in the RAM 180 by the processor 330 upon completion of the software routine can be read and returned to the RVD-XVC 300. The RVD-XVC 300 then determines the success or failure of the software routine, and signals this to the test manager 20. If as a result of this process it is determined that execution of the software routine was not successful, then the error is displayed at step 440, thereby allowing further analysis of that error to take place. However, assuming that the software execution was successful, in this context meaning that the write did take place, then the process proceeds to step 445, where it is determined with reference to the user test scenario whether a further configuration of the FIFO depth should be tested. Accordingly, at step 450, it is determined whether the test routine has finished, i.e. whether all desired FIFO depths have been tested, and if so the process ends at step 455. However, assuming that the process has not finished, the process returns to step 410, where the new FIFO depth is set, and the process repeated.

The test illustrated in FIG. 5B would be useful if the GPIO designer used the same logic to test for read or write buffer full, and wanted to make sure that write data would still be accepted even though the read buffer was full. This test process also tests that the software recognised the difference between read buffer and write buffer full. If either the GPIO hardware aborted the write, or the software state prevented the write from occurring then the test would have failed. Hence, it can be seen that this process provides co-verification of hardware and software.

Hence, in summary, it can be seen that the flow diagram of FIG. 5B shows the execution of a simple test manager test scenario, designed to prove that the software driver for a GPIO device 90 and the GPIO device 90 itself are working for a specific test case required by the GPIO designer. The GPIO driver software is being tested to ensure that it can write data into the GPIO device 90 and can correctly clear the FIFO full interrupt by reading from it. The GPIO designer wants to see this test case exercised over a range of FIFO depth configurations. By using this co-verification environment, these tests are completed with a very quick turnaround when compared to conventional verification techniques.

Figure 6:
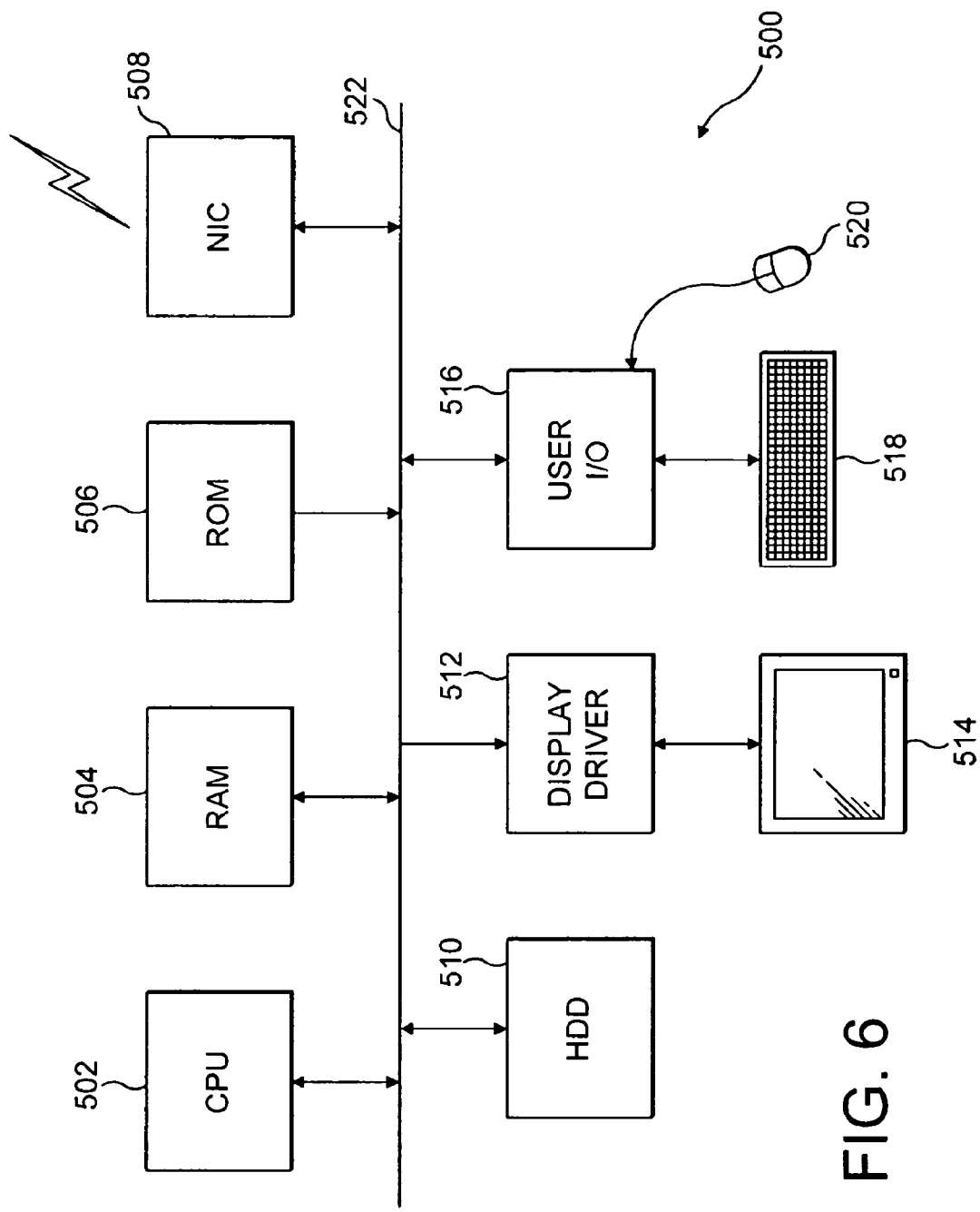
FIG. 6 schematically illustrates a general purpose computer of the type that may be used to implement the techniques of embodiments of the present invention.

FIG. 6 schematically illustrates a general purpose computer 500 of the type that may be used to implement the above described techniques. The general purpose computer 500 includes a central processing unit 502, a random access memory 504, a read only memory 506, a network interface card 508, a hard disk drive 510, a display driver 512 and monitor 514, and a user input/output circuit 516 with a keyboard 518 and mouse 520 all connected via a common bus 522. In operation, the central processing unit 502 will execute computer program instructions that may be stored in one or more of the random access memory 504, the read only memory 506 and the hard disk drive 510 or dynamically downloaded via the network interface card 508. The results of the processing performed may be displayed to a user via the display driver 512 and the monitor 514. User inputs for controlling the operation of the general purpose computer 500 may be received by the user input/output circuit 516 from the keyboard 518 or the mouse 520. It will be appreciated that the computer program could be written in a variety of different computer languages. The computer program may be stored and distributed on a recording medium or dynamically downloaded to the general purpose computer 500. When operating under control of an appropriate computer program, the general purpose computer 500 can perform the above described techniques and can be considered to form an apparatus for performing the above described techniques. The architecture of the general purpose computer 200 can vary considerably, and FIG. 6 is only one example.

A further description of the hardware and software co-verification techniques of embodiments of the present invention is given in the following appendix:

Contents
1 About this document
1.1 Terms and abbreviations
2 SCOPE
3 INTRODUCTION
3.1 Existing XVC test infrastructure
3.2 XVC test infrastructure with an RVD-XVC and processor model
4 RVD-XVC ACTION LIST
4.1 Typical test actions for the RVD-XVC
    4.1.1 Action 1 Wait for init: [<timeout>]
    4.1.2 Action 2 Set up Method name address resolution: <filename>
    4.1.3 Action 3 Execute Test: <Name>[<p1>] [<p2>] [<p3>] [<p4>]
    4.1.4 Action 4 Finished Tests:
    4.1.5 Action 5 Abort Test:
    4.1.6 Action 6 Execute RVD CLI command: <string>
5 THE RVD-XVC AND SOFTWARE COMMUNICATIONS LINK
5.1 Requirements
5.2 RVD-XVC comms link access
    5.2.1 Example System Memory Map
    5.2.2 Example Software configuration
5.3 RVD-XVC comms link data structure
    5.3.1 Header information
    5.3.2 Initialisation Handshake Protocol
    5.3.3 Data structure and type definitions
5.4 RVD-XVC comms link access protocol
    5.4.1 Action 1 Wait for init
    5.4.2 Action 3 Execute test
    5.4.3 Action 4 Finished tests
    5.4.4 Action 5 Abort test
5.5 Example XVCIO driver code for the software thread
    5.5.1 Software Task: main( )
    5.5.2 Software Task: XVCIO_InitCommsStruct ( )
    5.5.3 Software Task: XVCIO_CheckValidHeader( )
    5.5.4 Software Task: XVCIO_Handshake( )
    5.5.5 Software Task: XVCIO_InitComms( )
    5.5.6 Software Task: XVCIO_EnterPollLoop( )
5.6 RVD EABS API Calls used
1 About this Document
1.1 Terms and Abbreviations
    This document uses the following terms and abbreviations.

| Term | Meaning |
|---|---|
| Verification | The equivalence of two views (e.g. RTL and gate level). |
| Validation | Checking the design intent. |
| V&V | Verification and Validation Methodology |
| Level 4 | System Level. In-situ testing, for example interrupt testing with fifo-full conditions, usually by running verification code on ARM model. May include external models to provide realistic scenarios, e.g. Denali memory models, UART model, PCI model. |
| Level 3 | In System Block Level. As for Level4, but tests directed at specific block(s). |
| Level 2 | Integration Level. In-situ testing designed to prove out inter-block connectivity, for example timer block connected to interrupt control block. |
| Level 1 | Register Access Level. In-situ testing to confirm memory map reset, read and write properties. |
| Level 0 | Standalone Block Level. Module instantiated in standalone test bench, with the objective of achieving full functional coverage on that module. |
| System | The top element of the system architecture, specification tree, or system breakdown structure that is comprised of one or more products and associated life cycle processes and their products and services. |
| II | Initial Investigation Project Phase |
| DI | Detailed Investigation Project Phase |
| DT | Development and Test Project Phase |
| AMBA | Advanced Microcontroller Bus Architecture (rev 2.0: ASB, AHB, APB), (rev 3.0: AXI, AHB, APB) |
| APB | Advanced Peripheral Bus |
| AHB | Advanced High-performance Bus |
| AXI | Advanced eXtensible Interface |
| ADK | AMBA Developers Kit |
| ACT | AMBA compliance testbench |
| IP | Intellectual Property |
| Trick Box | Typically an RTL model in Verilog or VHDL that generates and/or monitors stimulus on external DUV I/O signals |
| PTB | The latest generation Trick Box that interfaces to the PFI layer of an XVC (see below) |
| PrimeCell | High quality reusable IP from ARM |
| ASM | Advanced Simulation Model |
| DSM | Design 'Sign-off' Model |
| TLM/TLV | Transaction level modelling/Transaction level verification |
| PV | Programmers view modelling abstraction e.g. master model calls slave->fn_transfer( ) |
| PVT | Programmers view with timing e.g. as PV but includes cycle level control signals associated with function calls |
| ADS | ARM Developer Suite |
| ADU | ARM Debugger for Unix |
| AVS | Architecture validation suite |
| DVS | Device validation suite |
| DUV | Design/Device under verification |
| BFM | A bus functional model typically written in RTL that has the ability to drive transfers onto a bus to stimulate a DUV |

| Term | Meaning |
|------|---------|
| XVC | Extensible verification component |
| XTSM | External test scenario manager |
| FRBM | An AHB Master capable of reading bus transactions from a stimulus file. This format is defined by the ADK team. |
| MLAHB | Multi-layer AHB |
| PTB | Peripheral Test Block |
| RVD | ARM RealView Debugger Environment |

2 Scope

Since the introduction of the XVC methodology in 2000, one of the longer term goals for system testing was to include the software environment when building and executing test scenarios. There have been various interim solutions to date for coordinating the execution of specific software test routines with the application of hardware stimulus, including the use of the Mentor Seamless environment for co-simulation of hardware and software.

Up until now however, none of these solutions has been able to address the sequencing and co-ordination of test routines as part of an XVC manager test scenario.

Why now? The reason for developing an RVD XVC at this current time is due to the emergence of standardized interfaces in the debugger tool chain and in the modeling group tool-chain (EABS and SimAbs2 respectively), that allow these missing bridging links to be formed. Now that EABS and SimAbs2 are part of RVD this gives rise to a number of advantages:

- Every abstraction level is covered with RVD from simulation level, through to FPGA and chip level
- There is a common C API to the RVD CLI control module at each level where an XVC can connect
- Software test scenarios can be executed at every abstraction level via the RVD-XVC
- Full software/hardware debug control is preserved, and the user can inter-work seamlessly with the RDV-XVC
- Software test routines can now be tightly coupled with hardware corner-case events
- No third-party EDA tools are required other than a simulator/FPGA tools to support this environment
- This environment lends itself to easier platform level auto-configurability, especially if hardware tests are written in a modular fashion—the software control sequence becomes the scenario rather than a hand-configured routine.
- There is no specific software structure that has to be maintained on the target, only a driver module, a free 32 bit memory location and a set of target test routines to be called with a fixed four integer parameter input format and a single integer return value. Parameter values are loaded into r0-r3 and the return value is presented using r0

3 Introduction

3.1 Existing XVC Test Infrastructure

Figure 7:
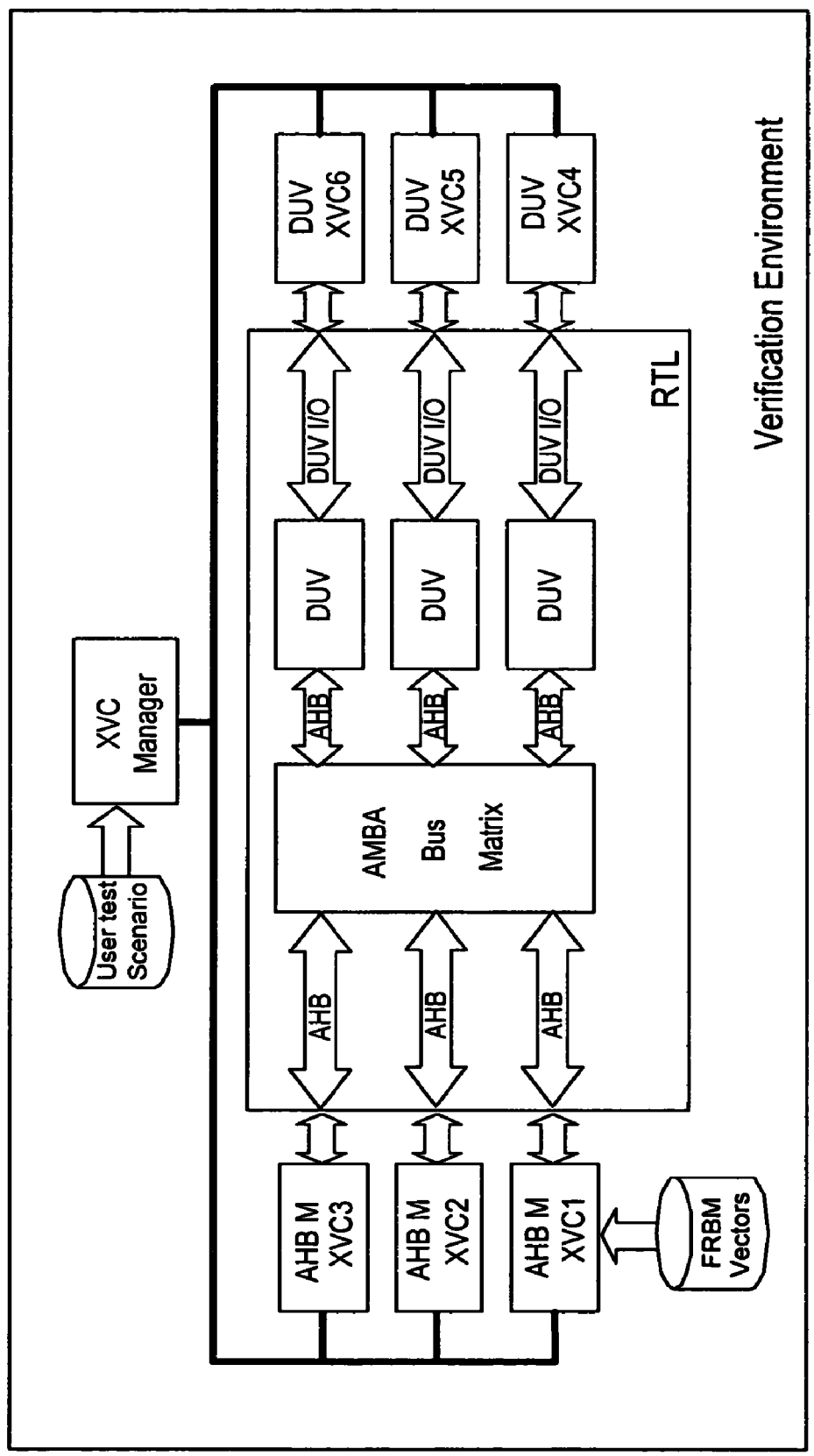
FIG. 7 is a diagram showing a conventional XVC testing environment.

FIG. 7 shows a conventional XVC testing environment.

In this verification environment, an AHB master XVC is used to drive the AMBA bus in place of a processor model. The AHB Master XVC has actions to either drive directed FRBM format vectors onto the bus, or to generate random patterns of transfers constrained by a user configuration file.

In either case, the above testbench environment cannot execute ARM assembler instructions; neither can it emulate a processors bus activity whilst executing the instruction stream. In the latter case, the XVC Master could be made to emulate typical bus activity using certain sequences of transfers, or by replaying captured vectors, but this mode of operation requires a number of prerequisite steps.

3.2 XVC Test Infrastructure with an RVD-XVC and Processor Model

Figure 8:
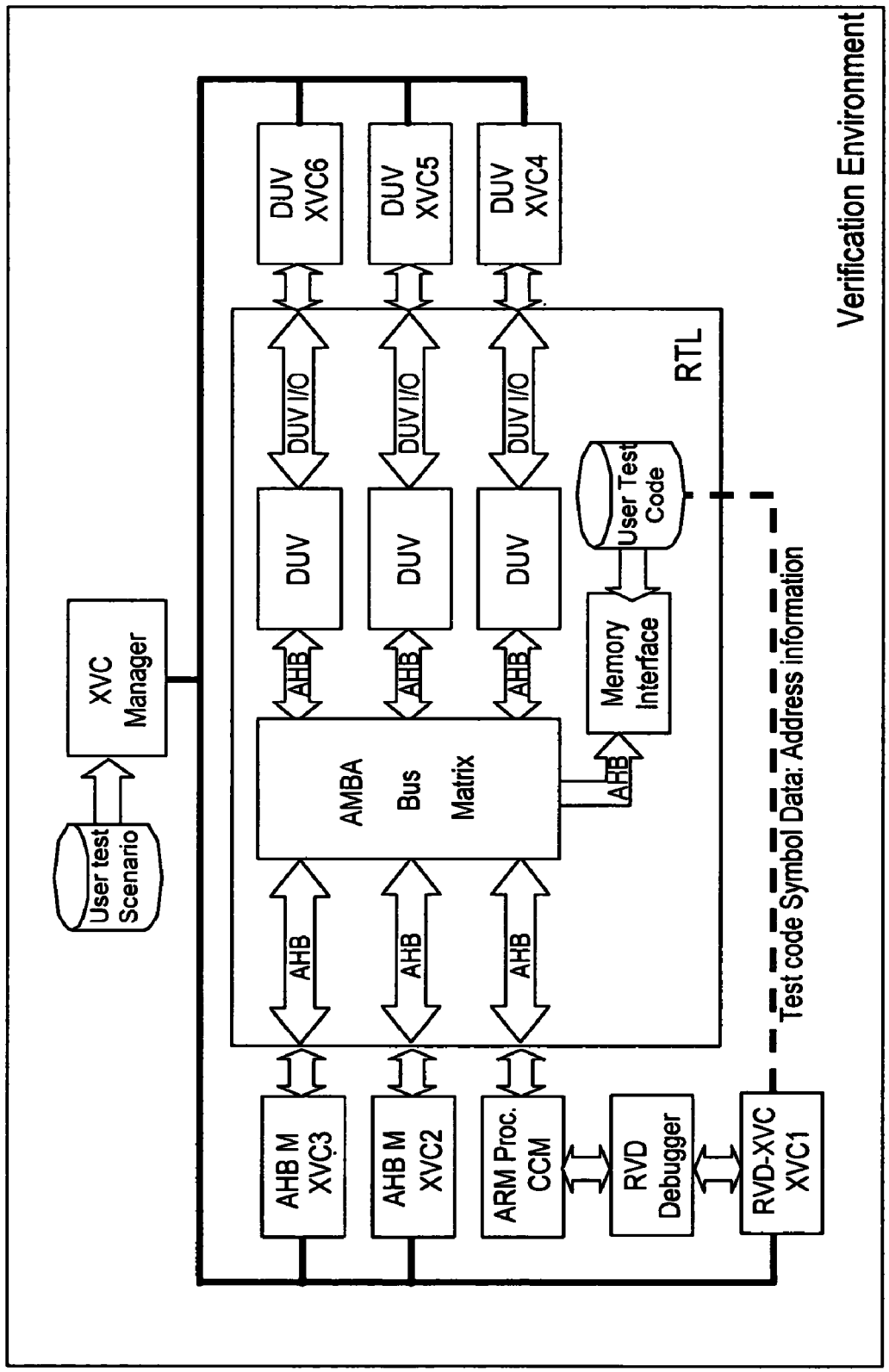
FIG. 8 shows a verification environment in accordance with one embodiment of the present invention.

FIG. 8 shows an XVC testing environment with the addition of an RVD environment, an RVD-XVC and a CCM processor model.

In this verification environment, the AHB master XVC is replaced by an ARMulator based processor CCM. The RealView Debugger is connected to the CCM and in turn the RVD-XVC is connected to the RealView Debugger via an EABS interface (RVD Third Party Extension Interface). RVD itself has a multi-processor connection and allows the user to debug targets that contain multi-processors. This ability is passed on to the RVD-XVC. Each RVD-XVC object will have access to any one instance of an RVD connected processor target, and will be able to make debug calls to any targets that it has connected to.

Unlike the conventional XVC Manager/XVC verification environment, the above environment provides a fully functional ARM software and debug environment, coupled with the ability to synchronise the execution of specific software test routines, with stimulus injected directly into the DUV that the software test routine is targeted at.

4 RVD-XVC Action List

4.1 Typical Test Actions for the RVD-XVC

The set of actions supported by the RVD-XVC are currently restricted to initiating specific test routines and checking their progress. This is because the primary purpose of using an XVC is to automate the execution of a software environment rather than to aid in interactive debugging such as setting breakpoints and stepping code. However for the sake of flexibility and future expansion, the RCD-XVC will support execution of RVD-CLI commands.

4.1.1 Action 1 Wait for init: [<timeout>]

In order for the software environment to be in a state where it can execute commands from the RVD-XVC, it may be necessary to wait for the communications channel between the RVD-XVC and the test software to be initialised. If the testbench is running in an RTL simulation environment, some significant time may elapse before the test software is ready to accept RVD-XVC commands. An optional timeout parameter in seconds can be specified to guard against software crashes or similar events that prevent the software from executing.

4.1.2 Action 2 Set Up Method Name Address Resolution: <filename>

Action 2 supports the execution of software test modules by name. This is achieved by the RVD-XVC reading a linker symdefs output log (e.g. armlink option-symdefs <filename>) to resolve the address of the desired test module and takes a fully qualified path name as an input parameter. The default name for the linker file is ./symdefs.txt. An example output format is provided below (comment: #, D:Data, A:ARM Code, T:Thumb Code):

```
#<SYMDBFS># ARM Linker, RVCT2.0 [Build 155]: Last Updated: Wed Oct. 8 15:56:00 2003
0x10000040 D gDefaultintHandler
0x10000044 D gIrqFiqInitialised
0x10000070 D IRQHandlerInstalled
0x10000074 D FIQHandlerInstalled
0x10000078 D IRQHandler
0x100000b8 D FIQHandler
0x10000158 D_stdin
0x1000019c D_stdout
0x100001e0 D_stderr
0x30000000 A VectorInitBlock
0x30000040 A StartBoot
0x30000050 A_main
0x30000054 A_scatterload
0x30000130 A main
```

4.1.3 Action 3 Execute Test: <Name>[<p1>] [<p2>] [<p3>] [<p4>]

Up to four parameters can be specified for the target test routine which will use the APCS calling conventions. The word size for each of these parameters is restricted to 32 bits. When an action is complete its return status will either be 0 for successful completion, or an error code will be returned.

A breakpoint debugger command is used to determine when the test routine has completed. This is to minimise the amount of interaction with the processor whilst the software routine is executing. The breakpoint function used is XVCIO-_Handshake_hook, the address of which is exported in the above symdefs file and is visible to the RVD-XVC. In fact the breakpoint mechanism is used as the main handshaking mechanism between the software environment and the RVD-XVC.

The software status location that will be updated when the function is complete is at shared memory location XVCIO-BASE+0x8 and will change from XVCIO_SWREADY to XVCIO_SWEXEC whilst the routine is executing and then to XVCIO_SWOKAY or XVCIO_SWERROR after the routine has completed.

4.1.4 Action 4 Finished Tests:

Sets the software/RVD-XVC link status on the target such that the software exits 'remote-control' mode. Any currently executing test action code will finish execution first. This action should be used in preference to Action 5 below. Once control has returned to the software environment, Action 1 needs to be called in order to synchronise the RVD-XVC with the software environment.

4.1.5 Action 5 Abort Test:

If a test action has been initiated it may be terminated early by the RVD-XVC by forcing a reset on the target processor model. No parameters are required for this action. Action 4 should be used in preference to this action. As with Action 4 above, once control has returned to the software environment, Action 1 needs to be called in order to synchronise the RVD-XVC with the software environment.

4.1.6 Action 6 Execute RVD CLI Command: <string>

Under certain test scenarios, especially where a debugger script needs to be called prior to code execution this action can be used to control the RVD command line directly. The string parameter represents a valid RVD CLI command.

5 The RVD-XVC and Software Communications Link 5.1 Requirements

Figure 9:
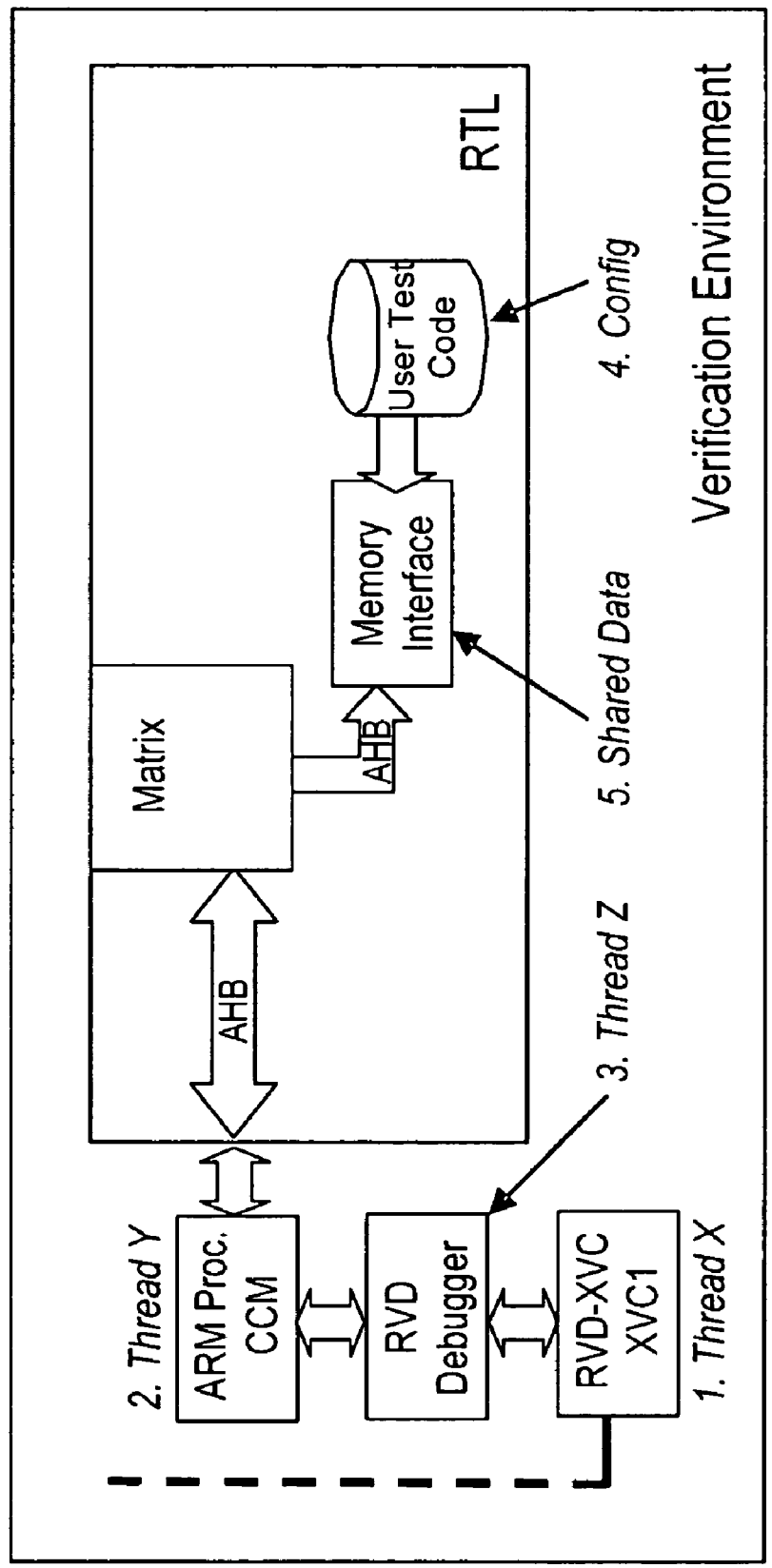
FIG. 9 is a diagram illustrating the communications link employed in one embodiment of the present invention.

With reference to FIG. 9, essentially the RVD-XVC (1) and CCM (2) operate in different thread execution spaces and are not naturally synchronised. This means that any communications link between the RVD-XVC and the CCM via RVD (3) will need to be used with this requirement in mind, i.e. either process must not be granted write access to the others memory area at any time; read access is granted at all times.

The common communications area/data is defined by the test code itself (4) and must be defined as a non-cacheable, non-bufferable block of memory. A single entry point is defined in a global symbol within the software that points to the communications area, the RVD-XVC will have access to this symbol before execution begins. This approach maximises flexibility for both the test software, the hardware architecture being used, and for future expansion of the interface.

In order to make the communications interface as simple as possible a co-operative polling approach will be used. This is because using interrupts is both intrusive and more difficult to debug. The drawback here is that test routines cannot be interrupted by the RVD-XVC in mid operation to examine progress etc, but this is not seen to be an important issue at this stage.

The main requirements then for the communications link between the RVD-XVC and the CCM of one embodiment will be:

A shared block of RAM is used for process/thread communications between the RVD-XVC and the CCM Handshaking will be performed across this block of RAM, with one discrete address per RVD-XVC thread and one for the CCM thread. Where the debug environment does not support shared data reads or writes from the RVD-XVC whilst the software thread is active, a breakpoint mechanism will be used for monitoring software test routine execution whenever the software thread requires input from the RVD-XVC. This methodology minimises the impact of the RVD-XVC on the software under test Writing is only permitted by each thread to its own address. No restrictions are in place for reading process communication addresses It is the responsibility of the user test code to define an area of memory where the communications link is based, this is pointed to by a global symbol that appears in the linker symdefs output file.

5.2 RVD-XVC Comms Link Access 5.2.1 Example System Memory Map

Figure 10:
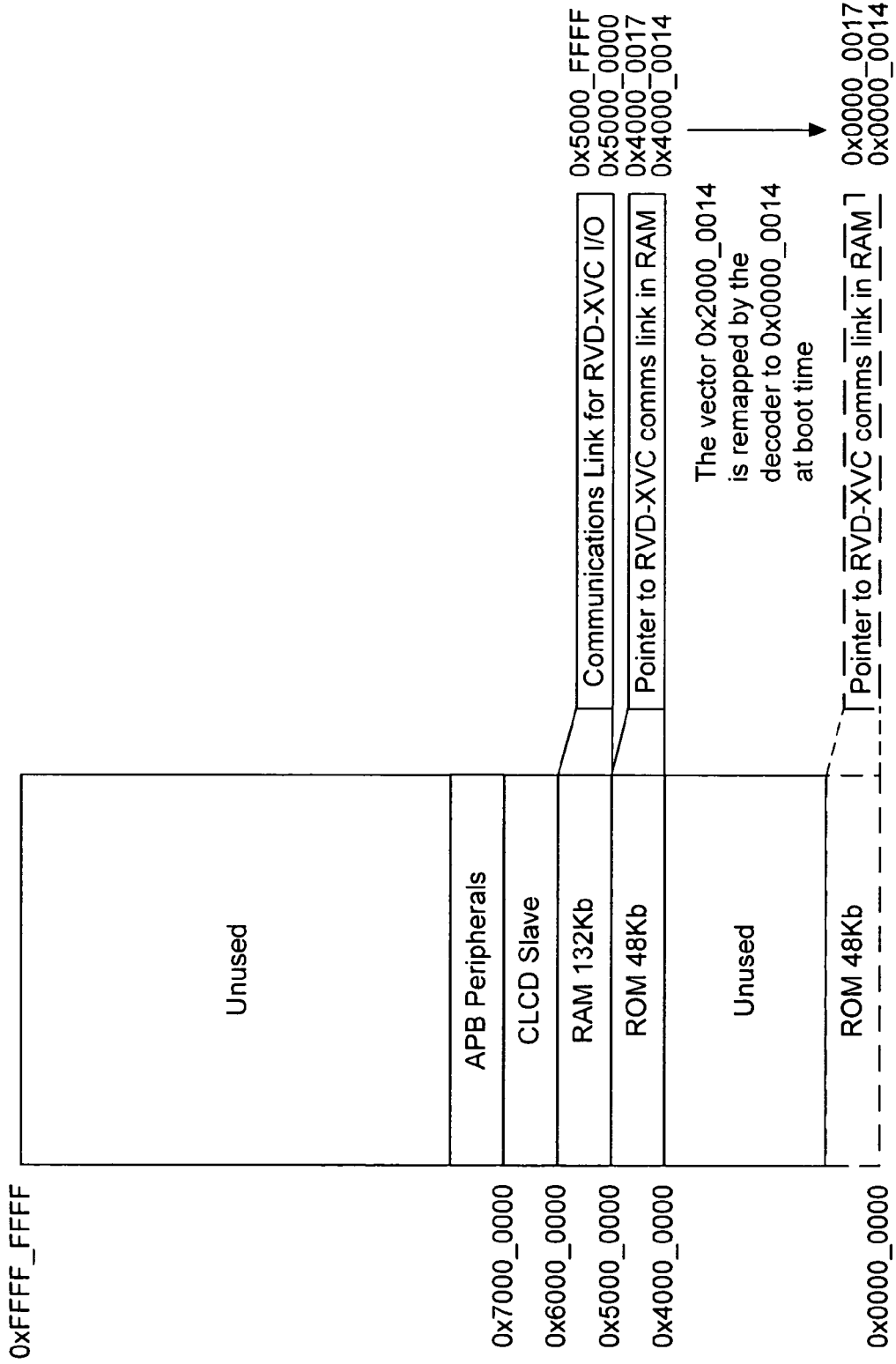
FIG. 10 illustrates an example system memory map of one embodiment.

With reference to item 5 of FIG. 9, the example system memory map of FIG. 10 shows the physical location of the RVD-XVC comms link pointer in the executable code that is to be loaded into the target system. This is a single location that points to a block of RAM containing a communications structure for data interchange between the RVD-XVC and the software itself.

The pointer is a fixed 32-bit address value stored in zero-memory at virtual location 0x14. This location is currently specified at the ARM reserved word of the vector table but may be moved to any other fixed location as required at a future date.

Using a vector table entry ensures that there is always a common entry-point for the RVD-XVC link, and allows maximum flexibility for relocation and future expansion of the RVD-XVC comms link interface software. Indeed by just declaring a static global structure in the source code, the user can use any memory map model that the TRM for their system specifies. The only pre-requisite here being that it is:

Accessible by the RVD program

RAM as opposed to ROM

5.2.2 Example Software Configuration

The following assembler file is an example boot-strap module including the definition of the vector table:

```
;--------------------------------------------------------------------------
; Boot Code Block:
;
                AREA        |Init|, CODE, READONLY
                EXPORT      VectorInitBlock           ; ROM Entry Point
                EXPORT      StartBoot                 ; System Startup Entry Point
                IMPORT      EHAND_UndefinedInstruction ; Undefined Instruction Handler
                IMPORT      EHAND_PrefetchAbort       ; Prefetch Abort Handler
                IMPORT      EHAND_DataAbort           ; Data Abort Handler
                IMPORT      IRQDispatcher             ; IRQ Handler
                IMPORT      FIQDispatcher             ; FIQ Handler
                IMPORT      SWIHandler                ; Software Interrupt Handler
                IMPORT      XVCIOBASE                 ; XVC Comms Interface Pointer
                IMPORT      ExtMemInit                ; External Memory Controller setup
                IMPORT      DoRemap                   ; Memory Remap from ROM to RAM
                IMPORT      SetupCPU                  ; CPU Specific Setup
                IMPORT      StartCode                 ; Initialise C Data and Stacks
                ENTRY
VectorInitBlock
                ; Set up the ROM vectors
                ;
                ; Note : The DoRemap routine will create a vector table in
                ;        RAM at location 0 upwards and fill each vector locn with the instructions
                ;        below
                ;
                B           StartBoot                 ; Vector 0x00 - Reset
                LDR         PC, UndefinedAddr         ; Vector 0x04 - Jump to Undefined Inst Address
                LDR         PC, SWIAddr               ; Vector 0x08 - Jump to Software Interrupt Address
                LDR         PC, PrefetchAddr          ; Vector 0x0C - Jump to Prefetch Abort Address
                LDR         PC, AbortAddr             ; Vector 0x10 - Jump to Data Abort Address
                DCD         XVCIOBASE                 ; Vector 0x14 - XVC IO comms structure pointer
                LDR         PC, IRQAddr               ; Vector 0x18 - Jump to IRQ Address
                LDR         PC, FIQAddr               ; Vector 0x1C - Jump to FIQ Address
                ; ROM Vector Addresses
ResetAddr       DCD         StartBoot                 ; Location 0x20 - Reset Handler Address
UndefinedAddr   DCD         EHAND_UndefinedInstruction ; Location 0x24 - Undefined Inst Handler Address
SWIAddr         DCD         SWIHandler                ; Location 0x28 - Software Interrupt Handler Address
PrefetchAddr    DCD         EHAND_PrefetchAbort       ; Location 0x2C - Prefetch Abort Handler Address
AbortAddr       DCD         EHAND_DataAbort           ; Location 0x30 - Data Abort Handler Address
                DCD         0                         ; Location 0x34 - Reserved
IRQAddr         DCD         IRQDispatcher             ; Location 0x38 - IRQ Handler Address
FIQAddr         DCD         FIQDispatcher             ; Location 0x3C - FIQ Handler Address
StartBoot       ROUT
                BL          ExtMemInit                ; Initialise Ext Memory Controller (ExtMemInit.s)
                BL          DoRemap                   ; Remap from ROM to RAM and copy Vec table to RAM
                BL          SetupCPU                  ; CPU Specific Setup (SetupCPU.s)
                B           StartCode                 ; Initialise C Data and Stacks (StartCode.s)
                END
```

Note that the above code stored the address of the imported symbol XVCIOBASE in the 6$^{th}$ entry of the vector table at offset address 0x14 from the program entry point. The symbol is resolved at link time as it is imported from a C module that declares the communications structure in RAM.

The following example C header code segment shows the declaration of the RVD-XVC communications data structure in memory. The actual definition of the XVCINOUT structure is described in more detail further on in this document in section 5.3.3:

```
#ifndef _XVCIO_h
#define _XVCIO_h
// ...
//--------------------------------------------------------------------------
//
// XVC IO control for software XVC
//
//--==========================================================================--
// Include enums and typedefs from section 5.3.3 here
#include "XVCIOdefs.h"
//--------------------------------------------------------------------------
// Allocate global memory for the XVC IO comms link
#ifdef XVCIO_SCOPE
#   undef XVCIO_SCOPE
#endif
```

-continued

```
#ifdef XVCIO_c
#   define XVCIO_SCOPE
#else
#   define XVCIO_SCOPE extern
#endif
volatile XVCIO_SCOPE XVCINOUT XVCIOBASE
#ifdef XVCIO_c
    = {XVCIO_INVALIDHEADER} // Set to XVCIO_ID on initialisation after _main( )
#endif
// . . .
#endif /* defined(_XVCIO_h) */
```

Using the conventions outlined above, this methodology gives access to the RVD-XVC comms link data structures via the XVCIOBASE symbol which is independent of any memory map configuration that is used. With the exception of the vector 0x14 which holds the address pointer to XVCIOBASE, no other hard coded address map variables need to be declared.

Note that the XVCIO_c defined above is declared in a .c implementation file (#define XVCIO_c), and is required such that the extern scope does not get applied in this instance. If no .c files include this define, then XVCIOBASE remains an unresolved external.

The following sections of this document define the data structure of the RVD-XVC comms link, and the handshaking mechanism used to get data in and out of the software environment in order for the RVD-XVC actions to be implemented.

5.3 RVD-XVC Comms Link Data Structure 5.3.1 Header Information

Figure 11:
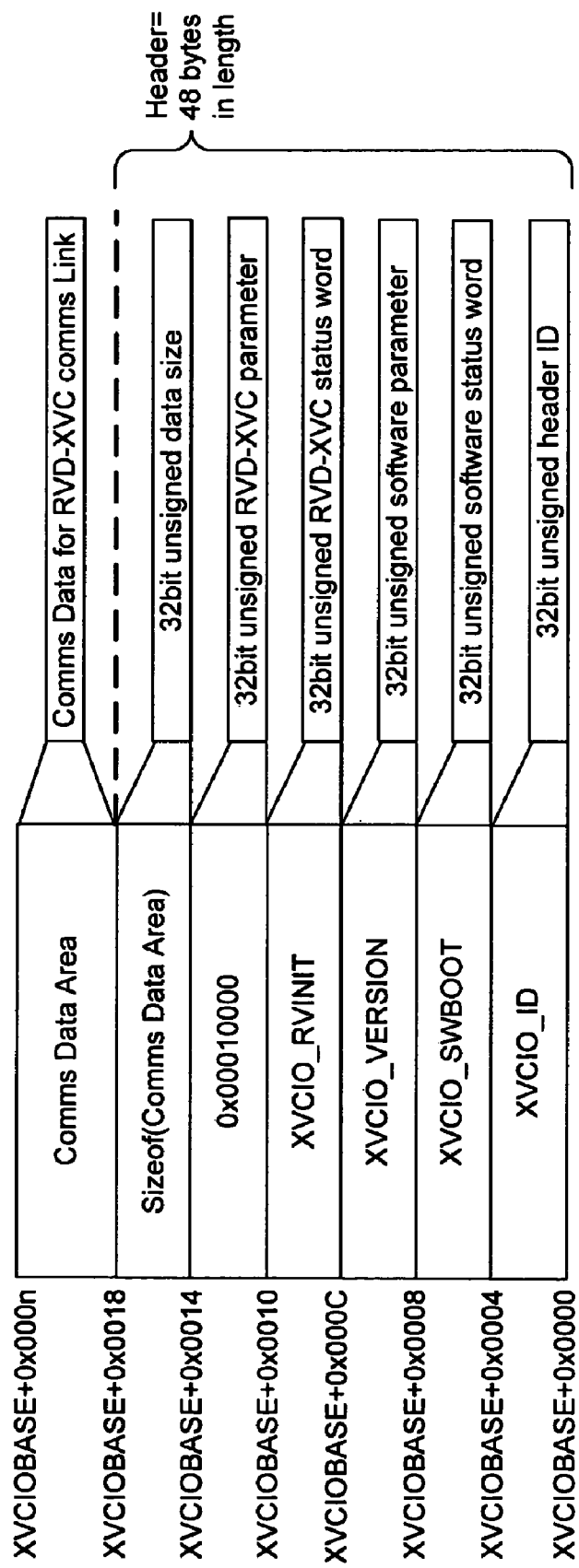
FIG. 11 illustrates the header format employed in one embodiment of the present invention.

FIG. 11 shows the header format pointed to by the contents of XVCIOBASE. As the vector 0x14 is assumed to point to XVCIOBASE by the RVD-XVC, there must be some validity checking done at this stage in order to correctly synchronise the RVD-XVC thread with the software thread. This is most easily done by adding a 32 bit unsigned constant at address XVCIOBASE+0x00. This is then followed by a 32 bit unsigned software status flag at XVCIOBASE+0x04, a 32 bit unsigned RVD-XVC status flag at XVCIOBASE+0x08, and a comms link data structure size at XVCIOBASE+0x0C.

It is intended that with subsequent revisions of RVD-XVC comms link software that this header format does not change.

5.3.2 Initialisation Handshake Protocol

As the RVD-XVC thread will already be running by the time the software thread has booted, it will initiate the following handshake sequence. Note that timeout values used below will vary depending on the relative execution speed of the RVD-XVC with the software implementation:

1. RVD-XVC will poll the header structure from XVCIOBASE+0 until XVCIO_ID is read, or a timeout occurs. The RVD-XVC will then write XVCIO_RVINIT to XVCIOBASE+0xC, and its version number to XVCIOBASE+0x10.
2. The software task will ensure that the header id at XVCIOBASE+0 is updated last in the structures initialisation sequence, this is in order to guarantee that the structure is correctly initialised before the RVD-XVC task reads it and therefore satisfies (1) above.
3. The software task will poll XVCIOBASE+0xC for XVCIO_RVINIT and then read and replace its initialised XVCIO_VERSION parameter with the contents of XVCIOBASE+0x10. The software task will the set its status at XVCIOBASE+0x4 to XVCIO_SWINIT.
4. The RVD-XVC will then clear its version parameter at XVCIOBASE+0x10 and then set XVCIOBASE+0xC to XVCIO_RVREADY.
5. The software task will poll for (4) above to complete and then clear its status parameter at XVCIOBASE+0x8 before finally setting its status at XVCIOBASE+0x4 to XVCIO_SWREADY.

FIG. 11 illustrates a handshake in progress. The purpose of the size field is simply to identify along with the version number that the data structure used for communications is consistent with that used by the RVD-XVC.

5.3.3 Data Structure and Type Definitions

With reference to the comms link access sequences below in section 5.4, the following data items make up the structure required to sustain a simple command-response link between the software thread running on the CCM and the RVD-XVC:

5.3.3.1 Enum Typedefs

```
typedef unsigned int (*XVCIO_TESTFUNCTION)(unsigned int r0, unsigned int r1, unsigned int r2, unsigned int r3);
typedef enum {XVCIO_INVALIDHEADER=0x00000000, XVCIO_ID=0x50F7101F } XVCIO_IDT;
typedef enum {XVCIO_DOCMDT=0x0 } XVCIO_CDT;
typedef enum {XVCIO_NOP=0x0, XVCIO_EXECUTE=0x1, XVCIO_FINISH=0x2, XVCIO_RESET=0x4 } XVCIO_CMDT;
typedef enum {XVCIO_SWBOOT=0x0000, XVCIO_SWINIT=0x0001, XVCIO_SWREADY=0x0004,
    XVCIO_SWEXEC=0x0008, XVCIO_SWERROR=0x000C, XVCIO_SWREADY=0x000C } XVCIO_SWSTATUS;
typedef enum {XVCIO_RVUNKNOWN=0x0000, XVCIO_RVINIT=0x0001, , XVCIO_RVREADY=0x0002,
    XVCIO_RVCMD=0X0004, XVCIO_RVERROR=0x0008} XVCIO_RVSTATUS;
typedef enum {XVCIO_HSWAIT=0x0, XVCIO_HSCMD=0x1} XVCIO_HANDSHAKE;
```

5.3.3.2 Comms Data Typedefs

Although the comms data is user defined, the default recommended structures are listed below which define a 'do command' structure that can be used to support RVD-XVC Action3: Execute test:

```
typedef struct tagXVCIO_DOCMD {
    XVCIO_CMDT cmd;        // Command ID
    unsigned int addr;     // Address of function to be called
    unsigned int r0;       // Parameters for function
    unsigned int r1;
    unsigned int r2;
    unsigned int r3;
    unsigned int task_id;  // Task ID <= XVCIO_MAXTASKID
    unsigned int retval;   // Finished task return value
} XVCIO_DOCMD;
typedef union tagXVCIO_COMMSDATA {
    XVCIO_DOCMD docmd;     // Data for executing a command
} XVCIO_COMMSDATA;
```

5.3.3.3 Main Structure Definition to be Defined at XVCIO-BASE+0x0

```
typedef struct tagXVCINOUT {
    XVCIO_IDT id;                     // RVD-XVC software IO interfaces: comms link structure id
    XVCIO_SWSTATUS uSWstatus;         // Status word for SW task to which the SW task has R/W access
    unsigned int uSWparam;            // Optional parameter for SW task status word
    XVCIO_RVSTATUS uRVDXVCstatus;     // Status word for RVD-XVC to which the RVD-XVC has R/W access
    unsigned int uRVDXVCparam;        // Optional parameter for RVD-XVC status word
    unsigned int uSize;               // Initialise to sizeof(COMMSDATA);
    XVCIO_CDT cdt;                    // Indicator of the type of data currently in comms data
    XVCIO_COMMSDATA cdData;           // User defined comms data structure
} XVCINOUT;
```

5.4 RVD-XVC Comms Link Access Protocol

The access protocols for the RVD-XVC/software comms link are expressed on the following pages as a set of UML sequence diagrams. Each sequence diagram represents an RVD-XVC Action being executed, with the RVD-XVC being shown on the left of each of the sequence diagrams, and the software thread running on the CCM on the middle and right.

What is not shown below is the passing of control to and from the RVD-XVC/debugger and the software app. This is currently achieved using a breakpoint sequence. This is because when the debugger hands control to the software thread it loses the ability to simultaneously update the shared software memory region until another break operation has occurred. An example breakpoint sequence from software boot is given below:

1. The RVD-XVC initially hands control to the software thread by executing a 'go' instruction via the debugger
2. When the software thread has booted and initialised, it will cause a breakpoint to occur and hand control back to the debugger for access from the RVD-XVC
3. The RVD-XVC will then examine and update any shared memory data as required and then hand control back to the software thread with another 'go' instruction via the debugger
4. When the software thread enters a command loop, it will cause a breakpoint to occur and hand control back to the debugger for access again from the RVD-XVC
5. The RVD-XVC fills in any command information by updating shared memory data as required and then hands control back to the software thread with another 'go' instruction via the debugger
6. The software thread will perform the requested command and then revert to step 4 until the command received from the RVD-XVC is a quit command.

Future hardware debug support however may not need to use this breakpoint methodology.

With or without hardware debug support for simultaneous memory access, the sequencing diagrams remain conceptually the same.

Note that actions 2 and 6 do not require direct interaction with the software thread and are not included below.

5.4.1 Action 1 Wait for init

Figure 12:
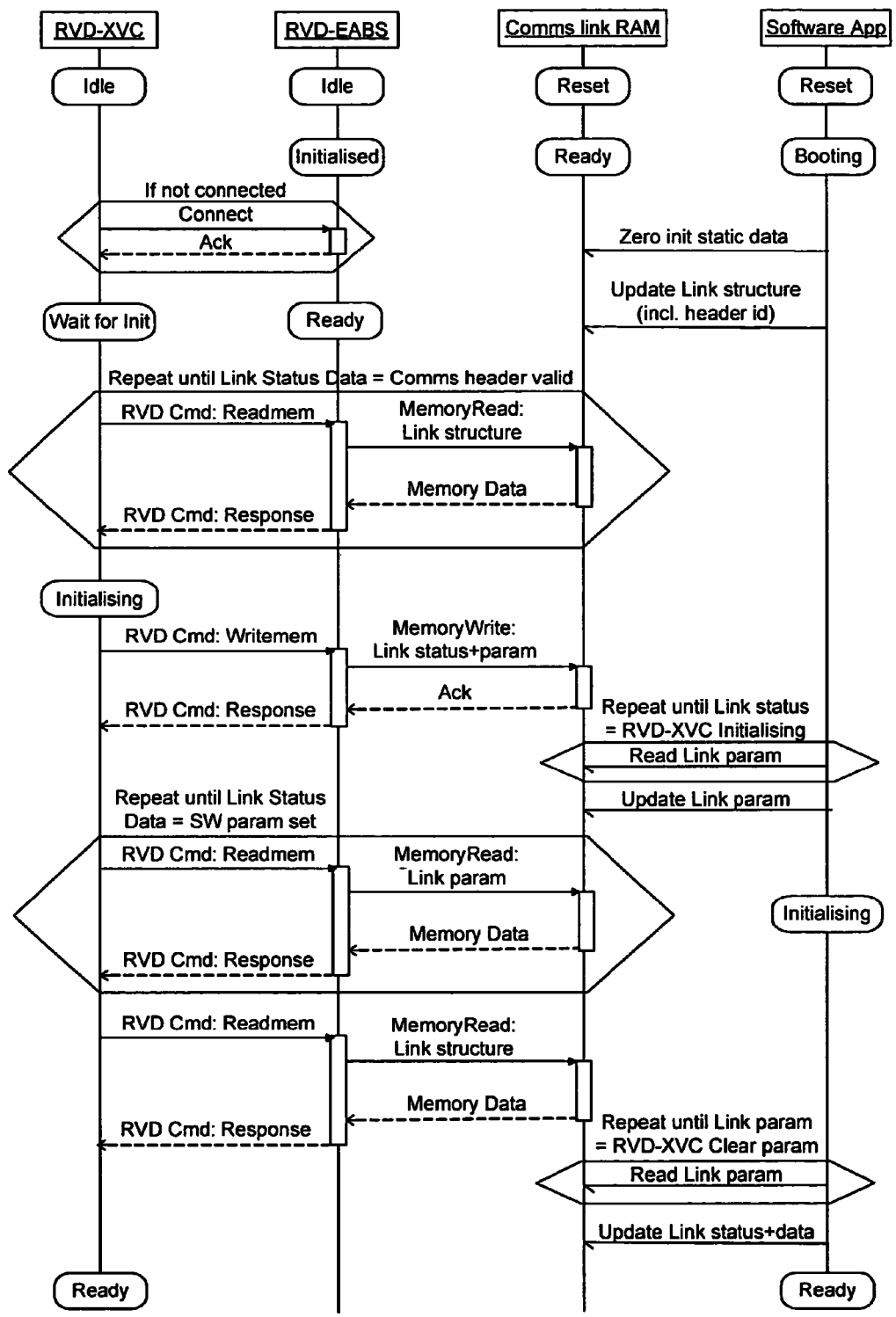
FIGS. 12 to 15 show sequences that occur in accordance with various test actions of embodiments of the present invention.

FIG. 12 shows a sequence for RVD-XVC Action 1, where the RVD-XVC uses the RVD-EABS interface to connect to a target processor, and then to poll a target memory address which is shared by the software thread (software app).

5.4.2 Action 3 Execute Test

Figure 13:
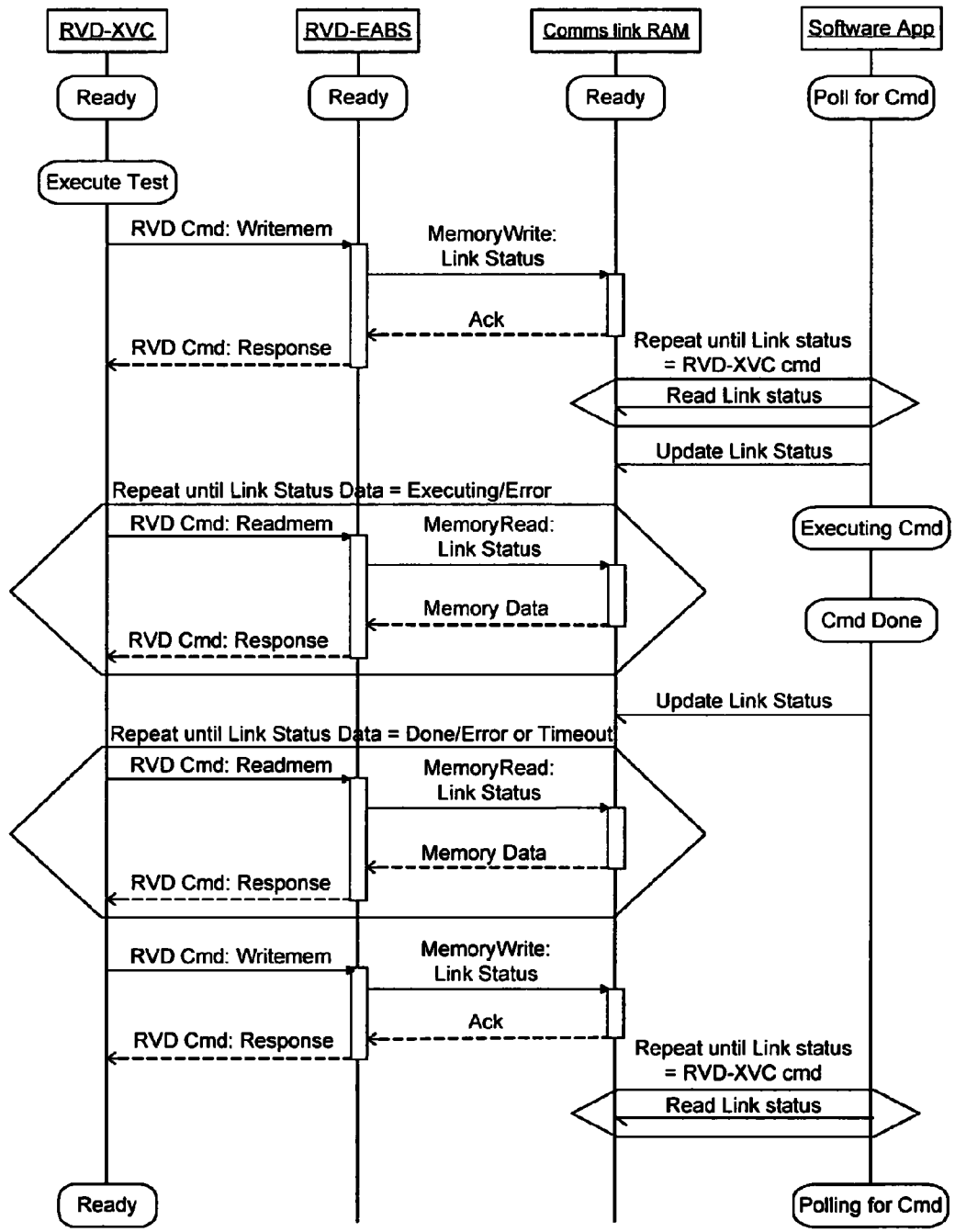

FIG. 13 is a sequence diagram for RVD-XVC Action 3. The execute test sequence requires a comms link to be already established via an Action 1 call as described above. The RVD-XVC updates the shared comms link RAM which is then picked up by the software thread which polls the comms link RAM for a command.

5.4.3 Action 4 Finished Tests

Figure 14:
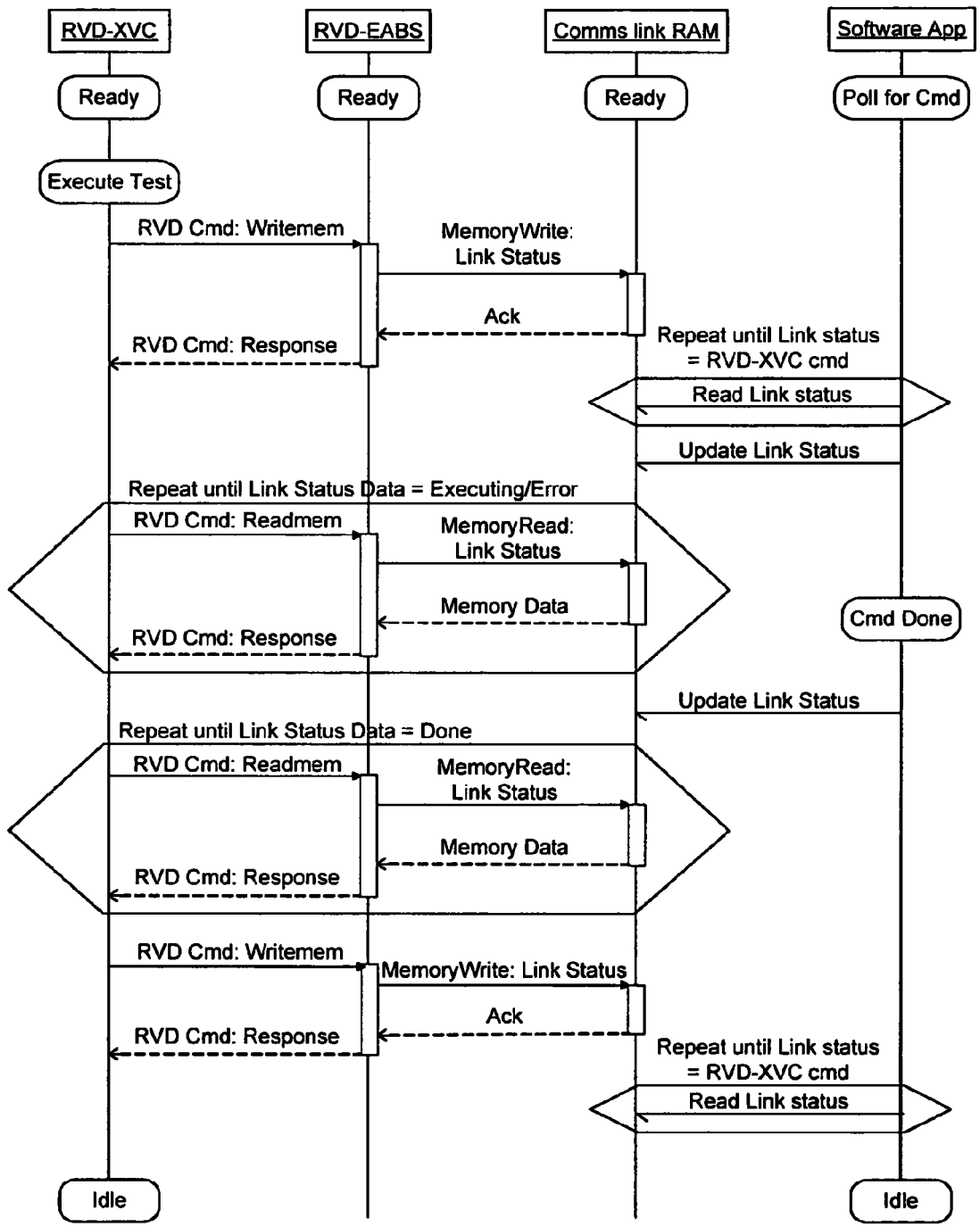

FIG. 14 is a sequence diagram for RVD-XVC Action 4. The finished tests action sends a command to the software thread to notify it that no more commands are pending. The software thread will either return immediately or wait for its current test to run to completion.

5.4.4 Action 5 Abort Test

Figure 15:
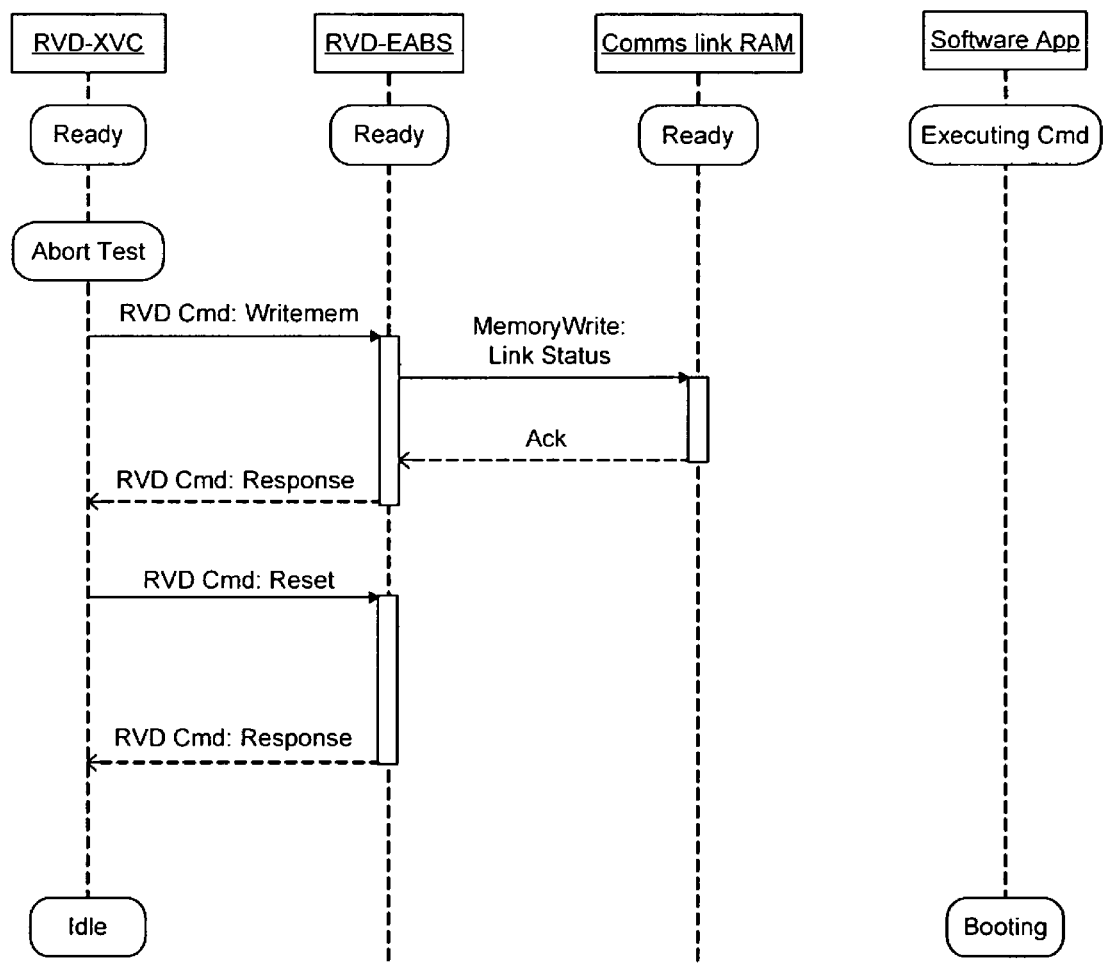

FIG. 15 is a sequence diagram for RVD-XVC Action 5. If a system error occurs such that the comms link has been lost between RVD-XVC and the software task, it may be necessary to force the software task to reset to that testing can conclude, or restart.

5.5 Example XVCIO Driver Code for the Software Thread

The code below is an example software task implementation based on the above specifications. The first code fragment shows the calls required from main to start the software task.

5.5.1 Software Task: main( )

```
//-----------------------------------------------------------------------
// Routine  .  main
//
// Purpose  .  Provide control mechanism for validation test routines
//
int main(int argc, char *argv[ ])
{
    volatile XVCINOUT *xvcinout = &XVCIOBASE;
    // Setup link with RVD-XVC
    if (XVCIO_InitComms(xvcinout) == FALSE) {
        return FAIL;
    };
    // Enter command loop
    if (XVCIO_EnterPollLoop(xvcinout) == FALSE) {
        return FAIL;
    };
    return PASS;
}// main
```

The following code fragments are an implementation of the XVCIO driver itself using the structures and typedefs defined above in section 5.3.3:

5.5.2 Software Task: XVCIO_InitCommsStruct( )

```
//------------------------------------------------------------------------
// Routine   . XVCIO_InitCommsStruct
//
// Purpose   . Set a valid header for the RVD-XVC comms link
//             this is to cater for embedded software that does not
//             have a global data initialisation library call before
//             entering _main
//
int XVCIO_InitCommsStruct(volatile XVCINOUT* xvc)
{
   // Check for invalid pointer
   if (xvc == (XVCINOUT*)NULL) return FALSE;
   // Initialise header structure
   xvc->uSWstatus            = XVCIO_SWBOOT;
   xvc->uSWparam             = XVCIO_VERSION;
   xvc->uRVDXVCstatus        = XVCIO_RVUNKNOWN;
   xvc->uRVDXVCparam         = 0;
   xvc->uSize                = sizeof(XVCIO_COMMSDATA);
   xvc->cdt                  = XVCIO_DOCMDT;
   xvc->cdData.docmd.cmd     = XVCIO_NOP;
   xvc->cdData.docmd.addr    = 0;
   xvc->cdData.docmd.r0      = 0;
   xvc->cdData.docmd.r1      = 0;
   xvc->cdData.docmd.r2      = 0;
   xvc->cdData.docmd.r3      = 0;
   xvc->cdData.docmd.task_id = 0;
   xvc->cdData.docmd.retval  = 0;
   xvc->id                   = XVCIO_ID;
   return XVCIO_CheckValidHeader(xvc);
}// XVCIO_InitCommsStruct
```

5.5.3 Software Task: XVCIO_CheckValidHeader( )

```
//------------------------------------------------------------------------
// Routine . XVCIO_CheckValidHeader
//
// Purpose . Check that we have a valid RVD-XVC comms block
//
int XVCIO_CheckValidHeader(volatile XVCINOUT* xvc)
{
   // Check for invalid pointer
   if (xvc == (XVCINOUT*)NULL) {
      return FALSE;
   };
   // Check that we can write to the header i.e. the address given is
   mapped to RAM
   if (xvc->id != XVCIO_ID) {
      return FALSE;
   };
   return TRUE;
}// XVCIO_CheckValidHeader
```

5.5.4 Software Task: XVCIO_Handshake( )

Note that in order for the handshaking mechanism to work correctly on current debugger implementations, a breakpoint is required on the function XVCIO_Handshake_hook. This breaks program execution for the RVD-XVC to gain access to the required debugger read and write memory commands to interact with the software.

Where the debugger supports simultaneous memory access through hardware support, no breakpoint function is required.

```
//------------------------------------------------------------------------
// Routine . XVCIO_Handshake_hook
//
// Purpose . Debugger entry point for setting a breakpoint
//
void XVCIO_Handshake_hook(XVCIO_HANDSHAKE ID, unsigned int* timeoutcnt) {
   *timeoutcnt += 1;
};
//------------------------------------------------------------------------
// Routine . XVCIO_Handshake
//
// Purpose . Wait for an expected status word/condition or timeout
//
int XVCIO_Handshake(unsigned int addr, unsigned int expected, unsigned int waitwhile,
unsigned int* timeoutcnt)
{
   unsigned int exit_flag = FALSE;
   *timeoutcnt = 0;
   // Wait for specified memory value check to be satisfied
   do {
      // Function for the debugger to breakpoint on
      XVCIO_Handshake_hook(XVCIO_HSWAIT, timeoutcnt);
      if ((*timeoutcnt) > XVCIO_MAXTIMEOUT) return FALSE;
      if (waitwhile == XVCIO_HANDSHAKE_NE) {
         exit_flag = (IO(addr) != expected)? TRUE : FALSE;
      } else {
         exit_flag = (IO(addr) == expected)? TRUE : FALSE;
      }
   } while (exit_flag == FALSE);
   return TRUE;
}// XVCIO_Handshake
```

Note that the IO macro used above is defined as:

```
#ifndef IO
#   define IO(addr)  (*((volatile unsigned*) (addr)))
#endif
```

5.5.5 Software Task: XVCIO_InitComms( )

```
//-------------------------------------------------------------------------
// Routine . XVCIO_InitComms
//
// Purpose . Synchronise with the RVD-XVC
//
int XVCIO_InitComms(volatile XVCINOUT* xvc)
{
  unsigned int timeout1;
  unsigned int timeout2;
  unsigned int xvcversion;
  // Ensure that the header is valid/initialised
  if (XVCIO_InitCommsStruct(xvc) == FALSE) return FALSE;
  // RVD XVC should write to its status register
  if (XVCIO_Handshake((unsigned int)&(xvc->uRVDXVCstatus), (unsigned int)XVCIO_RVINIT,
XVCIO_HANDSHAKE_NE, &timeout1) == FALSE)
  {
      return FALSE;
  };
  // Handshake with RVD-XVC by reading the RVD-XVC parameter word and responding
  // by complementing this value and taking 1 and storing in the SW parameter WORD
  // software status world
  if (xvc->uRVDXVCparam) {
    xvcversion      = xvc->uRVDXVCparam;
    xvc->uSWparam   = (-xvc->uRVDXVCparam)-1L;
    xvc->uSWstatus  = XVCIO_SWINIT;
  } else {
    return FALSE;
  };
  // RVD XVC should respond by clearing its parameter word
  if (XVCIO_Handshake((unsigned int)&(xvc->uRVDXVCparam), 0, XVCIO_HANDSHAKE_NE,
&timeout2) == FALSE)
  {
      return FALSE;
  };
  xvc->uSWparam = 0L;
  xvc->uSWstatus = XVCIO_SWREADY;
  return TRUE;
}// XVCIO_InitComms
```

5.5.6 Software Task: XVCIO_EnterPoilLoop( )

```
//-------------------------------------------------------------------------
// Routine . XVCIO_EnterPollLoop
//
// Purpose . Wait for commands from the RVD-XVC
//
int XVCIO_EnterPollLoop(volatile XVCINOUT* xvc)
{
    XVCIO_CMDT thiscmd = XVCIO_NOP;
    XVCIO_RVSTATUS rvdxvcstate = XVCIO_RVUNKNOWN;
    XVCIO_TESTFUNCTION tf;
    static unsigned int taskid = 0;
    unsigned int ack, timeout, cmd_timeout;
    unsigned int validcmd = FALSE;
    // Check for invalid pointer and for valid starting states
    if (XVCIO_CheckValidHeader(xvc) == FALSE) return FALSE;
    if (xvc->cdt != XVCIO_DOCMDT) return FALSE;
    if (xvc->uSWstatus != XVCIO_SWREADY) return FALSE;
    // ----------------- Loop until not finished or until error -----------------
    do {
      cmd_timeout = 0;
      // ---------------- Wait for a new command ----------------
      do {
        XVCIO_Handshake_hook(XVCIO_HSCMD, &cmd_timeout);
        rvdxvcstate = xvc->uRVDXVCstatus;
```

```
    } while ((rvdxvcstate == XVCIO_RVREADY) && (rvdxvcstate != XVCIO_RVERROR));
    if (xvc->uRVDXVCstatus != XVCIO_RVCMD) {
        xvc->uSWparam = 0L;
        xvc->uSWstatus = XVCIO_SWREADY;
        return FALSE;
    };
    validcmd = FALSE;
    thiscmd = xvc->cdData.docmd.cmd;
    // ---------------- XVCIO_RESET
    if (thiscmd == XVCIO_RESET) {
        validcmd = TRUE;
        xvc->id        = XVCIO_INVALIDHEADER;
        xvc->uSWstatus = XVCIO_SWREADY;
        return FALSE;
    };
    // ---------------- XVCIO_EXECUTE
    if (thiscmd == XVCIO_EXECUTE) {
        validcmd = TRUE;
        // Set up and call the specified function
        xvc->uSWparam = xvc->cdData.docmd.task_id = ++taskid;
        tf = (XVCIO_TESTFUNCTION) xvc->cdData.docmd.addr;
        xvc->uSWstatus = XVCIO_SWEXEC;
        xvc->cdData.docmd.retval  = tf(xvc->cdData.docmd.r0,
                                      xvc->cdData.docmd.r1,
                                      xvc->cdData.docmd.r2,
                                      xvc->cdData.docmd.r3);
        // Process return value
        xvc->uSWstatus = (xvc->cdData.docmd.retval)? XVCIO_SWERROR : XVCIO_SWOKAY;
        // Handshake return status out to RVD-XVC before continuing
        ack = XVCIO_Handshake((unsigned int)&(xvc->uRVDXVCstatus),
                              (unsigned int)XVCIO_RVCMD,
                               XVCIO_HANDSHAKE_EQ, &timeout);
        xvc->uSWparam =0L;
        xvc->uSwstatus = XVCIO_SWREADY;
    };
    // ---------------- XVCIO_FINISH
    if (thiscmd == XVCIO_FINISH) {
        validcmd = TRUE;
        // Handshake return status out to RVD-XVC before continuing
        xvc->uSWstatus = XVCIO_SWOKAY;
        ack = XVCIO_Handshake((unsigned int)&(xvc->uRVDXVCstatus),
                              (unsigned int)XVCIO_RVCMD,
                               XVCIO_HANDSHAKE_EQ, &timeout);
        xvc->uSWparam = 0L;
        xvc->uSWstatus = XVCIO_SWREADY;
    };
    xvc->uSWparam = 0L;
    xvc->uSWstatus = XVCIO_SWREADY;
    if (validcmd == FALSE) return FALSE;
    if (ack == FALSE) return FALSE;
    } while ((thiscmd != XVCIO_FINISH) ||(thiscmd != XVCIO_RESET));
    return TRUE;
}// XVCIO_EnterPollLoop
```

5.6 RVD EABS API Calls Used

EABS is an interface within RVD that allows 3rd parties to write a shared object, (.dll or .so), that plugs into RVD and gives access to its debug functionality. The shared object will be referred to as an EABS object. The EABS object is loaded at RVD startup and then controlled by the user through a window activated from the RVD menu system. The interface allows the EABS object to read and write memory, registers and variables. It also allows EABS object to be informed about key events happening in the debugger and on the target.

The following calls are required for communication between the RVD-XVC and the RVD itself and are called from within the AGI later of the RVD-XVC:

```
EABS_RET EabsInit( struct _EABS *self, EABS_LOCAL *pstEabsMaster, char *error_msg);
EABS_RET EabsTerm(struct _EABS *self, struct _EABS_LOCAL *pstEabs, char *buffer);
EABS_RET EabsStart(long lHandle);
EABS_RET EabsAddConn(long lConn, char* pchDesc);
EABS_RET EabsDeleteConn(long lConn);
EABS_SubmitCmd(lConn, name);
EABS_WriteMem(lConn, (unsigned long)lAddr, EABS_MEM_ACCESS_BYTE, 1, &uchValue,
    &bytes_written);
EABS_ReadMem(lConn, (unsigned long)lReadAddr, 4, EABS_MEM_ACCESS_BYTE, &bytes_read,
    &value[0]);
```

-continued

```
EABS_GetLastError(lConn, &error[0], &value);
void ReceiveEvent(EABS_EVENT evt, unsigned long lConn, void* pData);
```

From the above discussion of embodiments of the present invention, it will be appreciated that such embodiments of the present invention provide a particularly efficient and flexible technique for performing hardware and software co-verification whilst co-ordinating the execution of software routines with a sequence of verification tests. In one particular embodiment, an XVC-based hardware verification environment is connected through an ARM RealView Debugger (RVD) into a software environment running on an ARM processor, which is also connected commonly to the RVD. An RVD-XVC contains an algorithm for loading in an address map (derived from a standard ARMlink option) of functions of a piece of software code to be tested, and the technique of this embodiment provides an ability for a user to specify a sequence of software functions to be called which are interleaved precisely with hardware events. An interface protocol is also provided such that the RVD external interface (EABS extension DLL) can be used to communicate via a scratch RAM location accessible to the processor, to allow status information to be exchanged. A software algorithm/library and method of configuring a software application is also provided, such that the scratch RAM can be used to efficiently communicate with the RVD-XVC.

One additional way in which such embodiments can be used is in the automatic software testing of the RealView tools themselves, since the debugger becomes the slave in the test scenario, and automated/scripted debug sessions can be easily be replayed without the need for manual intervention. Remote control of the debugger also allows the test environment to be self-checking as well as automated, with the RVD-XVC acting as the checking mechanism for the debugger.

One advantage of the approach of embodiments of the present invention, apart from coupling hardware/software integration testing, is that this method can be applied at any abstraction level from SystemC model prototype simulation, through to RTL simulation, up to silicon level testing. In particular, embodiments of the present invention may be applied at any of the following abstraction levels:
1. SystemC Models, where the debugger and signal interface controllers connect via a SystemC interface
2. RTL—compiled and run on a hardware simulator computer program product
3. Simulation Acceleration Logic format—similar to compiled RTL but with certain logic functions mapped to configurable hardware logic elements, and encapsulated within a dedicated hardware debugging environment
4. Hardware Emulation Logic format—similar to FPGA but encapsulated within a dedicated hardware debugging environment. This approach is faster than option 3 above, but with restricted visibility of internal hardware logic states
5. FPGA
6. Silicon The methodology of embodiments of the present invention can also be generally applied to any debugger/software combination on any platform provided that the debugger software has an external software interface (API).

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. Apparatus for performing a sequence of verification tests to perform hardware and software co-verification on a system under verification, comprising:
a plurality of signal interface controllers operable to be coupled to said system under verification, each signal interface controller being operable to perform one or more test actions transferring at least one of one or more stimulus signals and one or more response signals between a corresponding portion of the system under verification and said signal interface controller during performance of said sequence of verification tests;
a debugger operable to control operation of a processing unit associated with the system under verification, the processing unit being operable to execute software routines;
a debugger signal interface controller operable to interface with the debugger and to perform one or more test actions transferring at least one of one or more stimulus signals and one or more response signals between the debugger and said debugger signal interface controller during performance of said sequence of verification tests; and
a test manager coupled to said plurality of signal interface controllers and the debugger signal interface controller and operable to transfer test controlling messages to said plurality of signal interface controllers and the debugger signal interface controller identifying the test actions to be performed;
the test manager being operable to control the operation of the processing unit via the debugger signal interface controller and the debugger in order to co-ordinate the execution of said software routines with the sequence of verification tests.

2. Apparatus as claimed in claim 1, further comprising a memory in which the software routines are stored, the debugger signal interface controller being provided with an address indication identifying the addresses of the software routines within the memory, upon receipt of a test controlling message from the test manager, the debugger signal interface controller being operable to generate a corresponding test action with reference to the address indication.

3. Apparatus as claimed in claim 2, further comprising a status memory operable to store status data, the processing unit being operable to execute monitoring code to monitor the status data in order to identify any changes to the status data and to then execute at least one of said software routines as identified by the change in status data, the corresponding test action being arranged to cause updated status data identifying a corresponding one of said software routines to be stored in the status memory under the control of the debugger.

4. Apparatus as claimed in claim 3, wherein the debugger is operable to cause the processing unit to store the updated status data in the status memory, whereafter the processing unit reverts to executing the monitoring code.

5. Apparatus as claimed in claim 2, wherein the processing unit has a plurality of registers associated therewith, and the corresponding test action is arranged to cause data in a selected register of said plurality of registers to be updated under the control of the debugger, such that the processing unit will then execute a corresponding one of said software routines.

6. Apparatus as claimed in claim 5, wherein the selected register is operable to store a program counter value and the corresponding test action is arranged to cause the program counter value to be updated in order to cause the processing unit to branch to the corresponding one of said software routines.

7. Apparatus as claimed in claim 1, wherein upon execution of one of said software routines, the processing unit is operable to update status data indicative of whether the software routine completed successfully, the debugger signal interface controller being operable to perform a predetermined test action in order to cause a breakpoint to be set by the debugger which is triggered when the processing unit performs said update of the status data.

8. Apparatus as claimed in claim 7, wherein the debugger is operable to issue a callback event to the debugger signal interface controller upon triggering of the breakpoint.

9. Apparatus as claimed in claim 1, wherein said stimulus and/or response signals are transferred between the debugger signal interface controller and the debugger using Application Programming Interface (API) calls.

10. Apparatus as claimed in claim 2, wherein at least one of the software routines is written into the memory via the debugger under the control of the debugger signal interface controller.

11. Apparatus as claimed in claim 1, wherein multiple processing units are provided, and a corresponding multiple of debugger signal interface controllers are provided, each debugger signal interface controller communicating with the same debugger to cause their respective test actions to be performed.

12. Apparatus as claimed in claim 1, wherein the timing of the execution of said software routines is co-ordinated with the sequence of verification tests.

13. Apparatus as claimed in claim 1, wherein the system under verification comprises a plurality of components, each signal interface controller being associated with one of said components.

14. Apparatus as claimed in claim 13, wherein the processing unit forms one of the components of the system under verification.

15. Apparatus as claimed in claim 1, further comprising the processing unit, the processing unit being provided externally to the system under verification.

16. Apparatus as claimed in claim 1, wherein the processing unit comprises a representation of a processor on which the software routines are intended to be executed.

17. Apparatus as claimed in claim 1, wherein the system under verification comprises a hardware simulator responsive to said one or more stimulus signals to generate said one or more response signals simulating a response of a data processing apparatus to said one or more stimulus signals if applied to said data processing apparatus.

18. A method of performing a sequence of verification tests to perform hardware and software co-verification on a system under verification, comprising the steps of:
performing in each of a plurality of signal interface controllers coupled to said system under verification one or more test actions transferring at least one of one or more stimulus signals and one or more response signals between a corresponding portion of the system under verification and said signal interface controller during performance of said sequence of verification tests;
controlling via a debugger execution of software routines by a processing unit associated with the system under verification;
performing in a debugger signal interface controller coupled with the debugger one or more test actions transferring at least one of one or more stimulus signals and one or more response signals between the debugger and said debugger signal interface controller during performance of said sequence of verification tests; and
transferring test controlling messages from a test manager to said plurality of signal interface controllers and to the debugger signal interface controller, the test controlling messages identifying the test actions to be performed;
whereby the test manager controls the operation of the processing unit via the debugger signal interface controller and the debugger in order to co-ordinate the execution of said software routines with the sequence of verification tests.

19. A method as claimed in claim 18, further comprising the steps of:
storing the software routines in a memory;
providing the debugger signal interface controller with an address indication identifying the addresses of the software routines within the memory; and
upon receipt of a test controlling message from the test manager, generating in the debugger signal interface controller a corresponding test action with reference to the address indication.

20. A method as claimed in claim 19, further comprising the steps of:
storing status data in a status memory;
executing on the processing unit monitoring code to monitor the status data in order to identify any changes to the status data and then executing at least one of said software routines as identified by the change in status data, the corresponding test action causing updated status data identifying a corresponding one of said software routines to be stored in the status memory under the control of the debugger.

21. A method as claimed in claim 20, further comprising the step of:
causing the processing unit to store the updated status data in the status memory, whereafter the processing unit reverts to executing the monitoring code.

22. A method as claimed in claim 19, wherein the processing unit has a plurality of registers associated therewith, and the corresponding test action causes data in a selected register of said plurality of registers to be updated under the control of the debugger, such that the processing unit will then execute a corresponding one of said software routines.

23. A method as claimed in claim 22, wherein the selected register is operable to store a program counter value and the corresponding test action causes the program counter value to be updated in order to cause the processing unit to branch to the corresponding one of said software routines.

24. A method as claimed in claim 18, further comprising the steps of:
upon execution of one of said software routines, employing the processing unit to update status data indicative of whether the software routine completed successfully; and
causing the debugger signal interface controller to perform a predetermined test action in order to cause a breakpoint to be set by the debugger which is triggered when the processing unit performs said update of the status data.

25. A method as claimed in claim 24, wherein the debugger issues a callback event to the debugger signal interface controller upon triggering of the breakpoint.

26. A method as claimed in claim 18, wherein said stimulus and/or response signals are transferred between the debugger signal interface controller and the debugger using Application Programming Interface (API) calls.

27. A method as claimed in claim 19, further comprising the step of:
writing at least one of the software routines into the memory via the debugger under the control of the debugger signal interface controller.

28. A method as claimed in claim 18, wherein multiple processing units are provided, and a corresponding multiple of debugger signal interface controllers are provided, each debugger signal interface controller communicating with the same debugger to cause their respective test actions to be performed.

29. A method as claimed in claim 18, wherein the timing of the execution of said software routines is co-ordinated with the sequence of verification tests.

30. A method as claimed in claim 18, wherein the system under verification comprises a plurality of components, each signal interface controller being associated with one of said components.

31. A method as claimed in claim 30, wherein the processing unit forms one of the components of the system under verification.

32. A method as claimed in claim 18, wherein the processing unit is provided externally to the system under verification.

33. A method as claimed in claim 18, wherein the processing unit comprises a representation of a processor on which the software routines are intended to be executed.

34. A method as claimed in claim 18, wherein the system under verification comprises a hardware simulator which in response to said one or more stimulus signals generates said one or more response signals simulating a response of a data processing apparatus to said one or more stimulus signals if applied to said data processing apparatus.

35. A computer program product embodied on a computer-readable medium for use in performing a sequence of verification tests to perform hardware and software co-verification on a system under verification, the computer program product comprising:
a plurality of signal interface controller code blocks operable to be coupled to said system under verification, each signal interface controller code block, when executed, causes a computer to perform one or more test actions transferring at least one of one or more stimulus signals and one or more response signals between a corresponding portion of the system under verification and said signal interface controller code block during performance of said sequence of verification tests;
debugger code, when executed, causes the computer to control operation of a processing unit associated with the system under verification, the processing unit being operable to execute software routines;
a debugger signal interface controller code block, when executed, causes the computer to interface with the debugger code and to perform one or more test actions transferring at least one of one or more stimulus signals and one or more response signals between the debugger code and said debugger signal interface controller code block during performance of said sequence of verification tests; and
test manager code coupled to said plurality of signal interface controller code blocks and the debugger signal interface controller code block and, when executed, causes the computer to transfer test controlling messages to said plurality of signal interface controller code blocks and the debugger signal interface controller code block identifying the test actions to be performed;
the test manager code, when executed, causes the computer to control the operation of the processing unit via the debugger signal interface controller code block and the debugger code in order to co-ordinate the execution of said software routines with the sequence of verification tests.

36. A computer program product as claimed in claim 35, wherein the software routines are stored in a memory, the debugger signal interface controller code block being provided with an address indication identifying the addresses of the software routines within the memory, upon receipt of a test controlling message from the test manager code, the debugger signal interface controller code block, when executed, causes the computer to generate a corresponding test action with reference to the address indication.

37. A computer program product as claimed in claim 36, wherein status data is stored in a status memory, the processing unit being operable to execute monitoring code to monitor the status data in order to identify any changes to the status data and to then execute at least one of said software routines as identified by the change in status data, the corresponding test action being arranged to cause updated status data identifying a corresponding one of said software routines to be stored in the status memory under the control of the debugger code.

38. A computer program product as claimed in claim 37, wherein the debugger code is operable to cause the processing unit to store the updated status data in the status memory, whereafter the processing unit reverts to executing the monitoring code.

39. A computer program product as claimed in claim 36, wherein the processing unit has a plurality of registers associated therewith, and the corresponding test action is arranged to cause data in a selected register of said plurality of registers to be updated under the control of the debugger code, such that the processing unit will then execute a corresponding one of said software routines.

40. A computer program product as claimed in claim 39, wherein the selected register is operable to store a program counter value and the corresponding test action is arranged to cause the program counter value to be updated in order to cause the processing unit to branch to the corresponding one of said software routines.

41. A computer program product as claimed in claim 35, wherein upon execution of one of said software routines, the processing unit is operable to update status data indicative of whether the software routine completed successfully, the debugger signal interface controller code block, when executed, causes the computer to perform a predetermined test action in order to cause a breakpoint to be set by the debugger code which is triggered when the processing unit performs said update of the status data.

42. A computer program product as claimed in claim 41, wherein the debugger code, when executed, causes the computer to issue a callback event to the debugger signal interface controller code block upon triggering of the breakpoint.

43. A computer program product as claimed in claim 35, wherein said stimulus and/or response signals are transferred between the debugger signal interface controller code block and the debugger code using Application Programming Interface (API) calls.

44. A computer program product as claimed in claim 36, wherein at least one of the software routines is written into the memory via the debugger code under the control of the computer executing the debugger signal interface controller code block.

45. A computer program product as claimed in claim 35, wherein multiple processing units are provided, and a corresponding multiple of debugger signal interface controller code blocks are provided, each debugger signal interface controller code block, when executed, causes the computer to communicate with the same debugger code to cause their respective test actions to be performed.

46. A computer program product as claimed in claim 35, wherein the timing of the execution of said software routines is co-ordinated with the sequence of verification tests.

47. A computer program product as claimed in claim 35, wherein the system under verification comprises a plurality of components, each signal interface controller code block being associated with one of said components.

48. A computer program product as claimed in claim 47, wherein the processing unit forms one of the components of the system under verification.

49. A computer program product as claimed in claim 35, wherein the processing unit is provided externally to the system under verification.

50. A computer program product as claimed in claim 35, wherein the processing unit comprises a representation of a processor on which the software routines are intended to be executed.

51. A computer program product as claimed in claim 35, wherein the system under verification comprises hardware simulator code, when executed, causes the computer, in response to said one or more stimulus signals to generate said one or more response signals simulating a response of a data processing apparatus to said one or more stimulus signals if applied to said data processing apparatus.

\* \* \* \* \*